United States Patent [19]

Fujisawa

[11] Patent Number: 5,581,533
[45] Date of Patent: Dec. 3, 1996

[54] OBJECTIVE LENS ACTUATING DEVICE, OPTICAL PICKUP EMPLOYING THE OBJECTIVE LENS ACTUATING DEVICE AND OPTICAL DISK RECORDING AND/OR REPRODUCING APPARATUS EMPLOYING SUCH OPTICAL PICKUP

[75] Inventor: Hirotoshi Fujisawa, Tokyo, Japan

[73] Assignee: Sony Corporation, Tokyo, Japan

[21] Appl. No.: 326,005

[22] Filed: Oct. 19, 1994

[30] Foreign Application Priority Data

Oct. 30, 1993 [JP] Japan .................................. 5-294272
Dec. 20, 1993 [JP] Japan .................................. 5-319780

[51] Int. Cl.$^6$ ...................................................... G11B 7/00
[52] U.S. Cl. ..................... 369/112; 369/44.15; 359/824; 359/814
[58] Field of Search ............... 369/44.16, 44.15, 369/112, 247; 359/813, 814, 823, 824

[56] References Cited

U.S. PATENT DOCUMENTS

| | | | |
|---|---|---|---|
| 4,449,213 | 5/1984 | Noborimoto et al. | 369/45 |
| 4,653,856 | 3/1987 | Kamiko | 359/814 |
| 4,669,823 | 6/1987 | Iguma et al. | 380/255 |
| 4,702,555 | 10/1987 | Iguma et al. | 350/247 |
| 4,766,583 | 8/1988 | Oinoue et al. | 359/814 |
| 4,927,235 | 5/1990 | Narumi | 350/252 |
| 4,948,230 | 8/1990 | Kasahara et al. | 350/255 |
| 5,046,820 | 9/1991 | Saekusa et al. | 359/814 |
| 5,073,883 | 12/1991 | Mitsumori | 369/44.1 |
| 5,144,607 | 9/1992 | Ishida et al. | 369/44.1 |
| 5,161,067 | 11/1992 | Tomiyama et al. | 359/824 |
| 5,208,703 | 5/1993 | Ikegame et al. | 359/813 |
| 5,220,459 | 6/1993 | Ichikawa et al. | 359/814 |
| 5,313,334 | 5/1994 | Tomiyama et al. | 359/824 |
| 5,323,378 | 6/1994 | Kim et al. | 369/44.16 |
| 5,428,481 | 6/1995 | Ikegame et al. | 359/811 |
| 5,446,721 | 8/1995 | Sekimoto et al. | 369/247 |

FOREIGN PATENT DOCUMENTS

| | | | |
|---|---|---|---|
| 0459080A3 | 12/1991 | European Pat. Off. | G11B 7/09 |
| 0617419A1 | 9/1994 | European Pat. Off. | G11B 7/09 |
| 56-056140 | 5/1981 | Japan | H02K 3/04 |
| 61-023307 | 1/1986 | Japan | H01F 15/10 |
| 63-219113 | 9/1988 | Japan | H01F 41/08 |
| 3022509 | 1/1991 | Japan | H01F 15/06 |
| 3020005 | 1/1991 | Japan | H01F 15/10 |
| 4078005 | 3/1992 | Japan | G11B 5/17 |

Primary Examiner—Loha Ben
Attorney, Agent, or Firm—Limbach & Limbach L.L.P.

[57] ABSTRACT

An objective lens actuating device including an objective lens, a bobbin, an elastic support and a magnetic circuit. The bobbin has the objective lens mounted at its one end and first and second coils at its other end. The elastic support has its one end mounted on an end of the bobbin carrying the objective lens and has its other end supported by a fixation portion, and supports the bobbin for deflection in a direction parallel to the optical axis of the objective lens and in a direction orthogonal to the optical axis. The magnetic circuit drives the bobbin at least in a direction parallel to the optical axis of the objective lens and in a direction orthogonal to the optical axis by a magnet carrying the yoke and the first and second coils mounted on the bobbin.

22 Claims, 12 Drawing Sheets

OBJECTIVE LENS ACTUATING DEVICE, OPTICAL PICKUP EMPLOYING THE OBJECTIVE LENS ACTUATING DEVICE AND OPTICAL DISK RECORDING AND/OR REPRODUCING APPARATUS EMPLOYING SUCH OPTICAL PICKUP

BACKGROUND

1. Field of the Invention

This invention relates to an objective lens actuating device and an optical pickup and an optical disc recording/reproducing apparatus employing the objective lens actuating device. More particularly, it relates to an actuating device for actuating an objective lens at least in a direction along the optical axis of the objective lens, an optical pickup unit employing such objective lens actuating device, and an optical disc recording and/or reproducing apparatus employing such optical pickup unit.

2. Background of the Invention

Up to now, an optical disc 64 mm in diameter and capable of recording music signals continuing about 74 minutes, has been employed as a recording medium for the optical disc recording and/or reproducing apparatus. Such an optical disc is housed within a cartridge main body formed by upper and lower cartridge halves joined to each other to form a disc cartridge for protecting the optical disc during non-use time such as during storage and for achieving facilitated handling.

Thus the disc cartridge 2 has a cartridge main body 5 constituted by the upper and lower rectangular-shaped cartridge halves 3, 4 molded by injection molding of synthetic resin, as shown in FIGS. 1 and 2. Within the cartridge main body 5 is housed an optical disc 1. A metal plate 7 is attached to the optical disc 1 for covering its center opening. This metal plate 7 acts as a clamper attracted by a magnet provided on a disc table as later explained.

The lower half 4 of the cartridge main body 5 having the optical disc 1 housed therein has an opening 6 for the disc table of the rotational disc driving unit adapted for rotationally driving the optical disc 1. Into the opening 6 is intruded the disc table when the disc cartridge 2 is loaded in the disc recording and/or reproducing apparatus. The opening 6 is contoured for facing the inner rim portion, inclusive of the metal plate 7, of the optical disc 1 housed within the cartridge main body 5, as shown in FIG. 2.

The upper and lower surfaces of the cartridge main body 5, that is the upper and lower halves 3, 4, are formed with recording/reproducing apertures 8, 9, respectively, for exposing a portion of a signal recording area of the optical disc 1 housed therein to the outside along its radius and to an optical pickup unit for recording/reproducing information signals. These recording/reproducing apertures 8, 9 are rectangular-shaped and positioned at a mid position along the left-and-right direction of the cartridge main body 5 for extending from the position proximate to the opening 6 for the disc table as far as the front end face of the cartridge main body 5, as shown in FIGS. 1 and 2. The recording/reproducing apertures 8, 9 are opened and closed by a shutter 10 having a U-shaped cross-section which is fitted on the front end face of the cartridge main body 5. Thus, during non-use time of the disc cartridge 2, the recording/reproducing apertures 8, 9 are closed by the shutter 10. When the recording/reproducing apertures 8, 9 are closed the shutter 10 is locked by a lock member arranged within the cartridge main body 5 for holding the shutter 10 over apertures 8, 9 in the closed position.

The disc cartridge 2 is sized to hold an optical disc 1 that is 64 mm in diameter (R), as shown in FIG. 1. Specifically, the disc cartridge 2 is of a width $W_1$ (along which the shutter 10 is moved for opening or closing the recording/reproducing apertures 8, 9, which is equal to 68 mm, a width $W_2$ (perpendicular to the width $W_1$ and equal to 72 mm), and a thickness D (equal to 5 mm).

Each of the recording/reproducing apertures 8, 9 formed in the cartridge main body 5 is of a length $L_1$ (along the radius of the disc 1 and equal to 24 mm) and a width $W_3$ (equal to 17 mm), as shown in FIG. 2.

By employing the above-described small-sized disc cartridge as the recording medium, it becomes possible to reduce the size of the optical disc recording and/or reproducing apparatus itself.

The optical disc recording and/or reproducing apparatus employing the optical disc as a recording medium has the optical pickup unit for condensing and radiating a light beam from a light source, such as a semiconductor laser, onto the signal recording area of the optical disc and for detecting the return light from the optical disc for recording information signals on the optical disc or reproducing the information signals prerecorded on the disc. Such optical pickup unit is comprised of optical components, such as an optical block made up of the semiconductor laser as the light source for radiating the light beam onto the optical disc, a photosensor for detecting the return light from the optical disc, a beam splitter for separating the light beam emanated from the semiconductor laser from the return light outgoing from the semiconductor laser, and an objective lens driving device having an objective lens for converging the light beam radiated from the light source to the recording track on the optical disc and for forcing the light beam to follow the recording track on the optical disc.

The objective lens driving device, constituting the optical pickup unit employed in the optical disc recording and/or reproducing apparatus, is comprised of a support base 11 constituting a magnetic circuit, a bobbin support 12 mounted in a cantilevered fashion on the supporting base 11 and a bobbin 14 carrying an objective lens 13, as shown in FIG. 3.

On the support base 11 are set a pair of supporting pins 16, 17 for supporting a stationary fixation portion 15 provided at the proximal end of the bobbin support 12. A pair of U-shaped yokes 18, 19 are formed at both distal sides of the support base 11. Magnets 20, 21 are mounted on the inner lateral sides of lugs 18a and 19a constituting the yokes 18, 19, respectively.

The bobbin support 12 has the fixation portion 15 molded from a synthetic material and having pin inserting holes 22, 23 that engage the supporting pins 16, 17, respectively. A pair of parallel supporting arms 25, 26 are extended to form a lateral side of the fixation portion 15. The supporting arms 25, 26 have their distal ends connected together by a connecting portion 12a. The connecting portions of the parallel supporting arms 25, 26 to the fixation portion 15 and the connecting portions of the supporting arms 25, 26 to the connecting portion 12a, are formed as deflecting portions 27, 27 and 29, 29 in the focusing direction extending parallel to each other along the width of the supporting arms 25, 26. These deflecting portions are of reduced thicknesses and are adapted for being displaced in the focusing direction. By forming the deflecting portions in this manner, the parallel supporting arms 25, 26 may be displaced parallel to the axes of the supporting pins 16, 17 supporting the fixation portion 15. At the distal ends of the connecting portions 29 is formed a bobbin mounting portion 32 via a deflecting portion 31 in the tracking direction. Bobbin mounting portion 32 is reduced in thickness and formed parallel to the axial direction of the supporting pins 16, 17 supporting the fixation portion 15.

The bobbin 14, supported via the bobbin mounting portion of the bobbin support 12, has a lens mounting portion 33 for mounting the objective lens 13 at its one end. The objective lens 13 is mounted in the lens mounting portion 33 via a lens holder fitted in an engaging opening in the lens mounting portion 33. The bobbin 14 also has a U-shaped cut-out 34 in which the parallel supporting arm 25, 26 are extended from the opposite end towards the center of the bobbin 14. On the inner lateral side of the cut-out 84 is formed a fitting recess 35 in which is fitted the bobbin mounting portion 32 provided at the distal end of the bobbin support 12. In the opening end of the cut-out 34 is mounted a balance weight for maintaining weight balance with respect to the objective lens 13 attached to the lens mounting portion 33.

On the opposite lateral sides of the upper surface of the bobbin 14 are formed coil setting recesses 37, 38. In these mounting recesses 37, 38 are set focusing coils 39, 40 wound in square-shaped tubes. On the outer lateral sides of the focusing coils 39, 40 are pairs of tracking coils 41, 42 wound in the form of flat rectangles.

The bobbin 14 carrying the objective lens 13 is supported by the bobbin support 12 by having the bobbin mounting portion 32 at the distal ends of the parallel arms 25, 26 in the fitting recess 35 formed in the inner lateral sides of the cut-out 34. The objective lens actuating device is completed by inserting the supporting pins 16, 17 through the pin inserting openings 22, 23 bored in the fixation portion 15 for having the bobbin support 12 carrying the bobbin 14 mounted on the supporting base 11. At this time, the legs 18b, 19b of the yokes 18, 19 provided on the supporting base 11 are introduced into the tubular focusing coils 39, 40 mounted on the bobbin 14, with the magnets 20, 21 attached to the lugs 18a, 19a facing the focusing coils 39, 40 and the tracking coils 41, 42.

In the above-described objective lens driving device, a driving current proportional to the focusing error signal is supplied to the focusing coils 39, 40. Such driving current cooperates with the magnetic flux produced by the magnets 20, 21 to generate a driving force in the focusing direction parallel to the optical axis of the objective lens 13. By such driving force, the parallel arms 25, 26 are deflected along the focusing direction shown by arrow F in FIG. 3, with the deflecting portions 27, 27 and 29, 29 as the points of deflection. As a result, the objective lens 13 mounted on the bobbin 14 supported on the distal ends of the parallel arms 25, 26 is deflected in the focusing direction for effecting the focusing control.

A driving current proportional to the tracking error signal is supplied to the tracking coils 20, 21. Such driving current cooperates with the magnetic flux produced by the magnets 20, 21 to generate a driving force in the tracking direction normal to the optical axis of the objective lens 13. By such driving force, the bobbin 14 supported at the distal ends of the parallel arms 25, 26 is deflected along the tracking direction shown by arrow T in FIG. 3, with the deflecting portion 31 as the point of deflection. As a result, the objective lens 13 is deflected in the tracking direction along the radius of the optical disc normal to the optical axis and, the light flux is caused to follow the recording track in the optical disc for effecting the tracking control.

With the above-described objective lens driving device, the fixation portion 15 provided on the proximal end of the bobbin support 12 is supported by the supporting base 11, and the bobbin 14 carrying the objective lens 13 is supported via the bobbin mounting portion 32 mounted at the distal ends of the parallel supporting arms 25, 26 extended from the fixation portion 15. The magnetic circuit is made up of the yokes 18, 19 and the magnets 20, 21 for generating the driving force for displacing the objective lens 13 mounted on the bobbin 14 in the direction parallel to the optical axis of the objective lens 13 and in the direction normal to the optical axis along with the focusing coils 39, 40 and the tracking coils 41, 42 mounted on the bobbin 14.

The magnetic circuit is arranged between the stationary fixation portion 15 to the supporting base 11 and the objective lens 13. Consequently, the parallel supporting arms 25, 26 carrying the bobbin 14 are increased in length and the length between the mounting portion 15 and the bobbin 14 is increased, resulting in the increased length of the objective lens actuating device.

If the above-described large-sized objective lens actuating device is applied to the optical disc recording and/or reproducing apparatus employing the disc cartridge 2 housing the optical disc 1 (64 mm in diameter), the bobbin 14 including the objective lens 13 only partially faces the recording/reproducing apertures 8, 9, with the remaining portion of the bobbin extending on the lower surface of the cartridge main body 5, as shown in FIG. 4.

Thus the objective lens actuating device needs to be mounted at a position spaced some distance apart from the lower surface of the disc cartridge 2 loaded on the optical disc recording and/or reproducing apparatus, in order that the bobbin 14 or the bobbin support 12 is not contacted with the rim of the recording/reproducing apertures 8, 9 of the cartridge main body 5 when the objective lens 13 is displaced along the optical axis.

If the objective lens actuating device is arranged in this manner at a position spaced some distance away from the disc cartridge 2, the objective lens 13 for focusing the light beam in the signal recording region of the optical disc 1 is increased in focal length, as a result of which the objective lens 13 and hence the objective lens actuating device are increased in size. Thus it becomes difficult to reduce the size of the optical disc recording and/or reproducing apparatus employing the objective lens actuating device.

Thus, attempts have been made in decreasing the differential distance between the end face of the objective lens 13 and the signal recording area of the optical disc 1, and in employing a small-sized objective lens 13 with a small focal length in order to reduce the size of the objective lens actuating device. One such objective lens actuating device is shown in FIG. 5, and includes a lens supporting lug 43 protrudes from an end of the upper surface of the bobbin 14, and the lens mounting portion 33 is mounted on this lens supporting lug 43, by means of which the objective lens 13 is mounted. This permits the objective lens 13 to face the inside of the recording/reproducing apertures 8, 9 and to approach to the optical disc 1. In addition, the differential distance between the objective lens 13 and the disc 1 is diminished to render it possible to employ the small-sized objective lens 13 to reduce the size of the objective lens driving device.

However, even if the objective lens 13 and hence the objective lens driving device are reduced in size, the portion of the bobbin other than the objective lens 13 is extended along the lower surface of the cartridge main body 5, so that it is difficult to further reduce the size of the optical disc recording and/or reproducing apparatus.

In addition, if the objective lens 13 is mounted via the lens mounting lug 43, the lens supporting lug 43 or the supporting arms 25, 26 are deformed significantly with lapse of time. Consequently, the optical axis of the objective lens 13 is skewed and hence its optical axis cannot be maintained with high accuracy so as to be normal to the optical disc 1.

Besides, since only the objective lens 13 is protruded from the bobbin 14 for approaching the optical disc 1, the objective lens 13 is mounted at a position spaced apart from the magnetic circuit generating the driving force, so that it becomes difficult to deflect the objective lens 13 with high response to the driving force proportionate to the focusing and tracking signals.

On the other hand, it becomes impossible to effect accurate focusing control and tracking control of the objective lens 13, so that recording and/or reproduction of information signals occasionally cannot be achieved with good recording/playback characteristics.

SUMMARY OF THE INVENTION

It is therefore an object of the present invention to provide an objective lens driving device which resolves the above-mentioned problems.

It is another object of the present invention to provide an optical pickup unit which resolves the above-mentioned problems.

It is yet another object of the present invention to provide an optical disc recording and/or reproducing apparatus employing a disc cartridge which resolves the above-mentioned problems.

In one aspect, the present invention provides an objective lens actuating device comprising an objective lens, a bobbin having the objective lens mounted on its one end and also having a coil mounted on its other end, an elastic support having its one end mounted on said one end of the bobbin carrying the objective lens and having its other end secured to a fixation portion, and a magnetic circuit having a yoke on which the fixation portion carrying the other end of said elastic support and the magnet are mounted. The bobbin is driven at least in a direction parallel to the optical axis of the objective lens by the magnet carrying the yoke and the coil mounted on the bobbin.

In another aspect, the present invention provides an objective lens actuating device comprising an objective lens, a bobbin having the objective lens mounted on its one end and also having a first coil and a second coil mounted on its other end, and an elastic support having its one end mounted on the one end of the bobbin carrying the objective lens and having its other end secured to a fixation portion. The elastic support supports the bobbin for deflection in a direction parallel to the optical axis of the objective lens and in a direction normal to the optical axis. There is also provided a magnetic circuit having a yoke on which the fixation portion carrying the other end of the elastic support and the magnet are mounted. The bobbin is driven in a direction parallel to the optical axis of the objective lens and in a direction normal to the optical axis by the magnet carrying the yoke and the first and second coils mounted on the bobbin. The objective lens driving device is dimensioned to have a length along the direction of deflection of the bobbin in the direction normal to the optical axis of the objective lens of 8 mm or less, a length along the direction normal to the direction of deflection of 17 mm or less, and a height of 10 mm or less.

In still another aspect, the present invention provides an optical pickup unit comprising an objective lens actuating device having an objective lens, a bobbin having the objective lens mounted on its one end and also having a coil mounted on its other end, an elastic support having its one end mounted on the one end of the bobbin carrying the objective lens and having its other end secured to a fixation portion, and a magnetic circuit having a yoke on which the fixation portion carrying the other end of said elastic support and the magnet are mounted. The bobbin is driven at least in a direction parallel to the optical axis of the objective lens by the magnet carrying the yoke and the coil mounted on the bobbin. There are also provided a light source, a mirror arranged below the object lens actuating device for deflecting a light beam radiated from the light source by 90° a beam splitter for separating the light beam radiated from the light source from a light beam incident thereon from the light source, a light sensor for receiving the light beam from the beam splitter, and a base for mounting the object lens mounting device, light source, mirror, beam splitter and the light sensor.

In still another aspect, the present invention provides an optical pickup unit comprising an objective lens driving device having an objective lens, a bobbin having the objective lens mounted on its one end and also having a coil mounted on its other end, an elastic support having its one end mounted on the one end of the bobbin carrying the objective lens and having its other end secured to a fixation portion, and a support holder to which the other end of the elastic support is mounted and which has a light transmitting portion oriented in a direction normal to the optical axis of the objective lens mounted on the bobbin. The light transmitting portion allows for passage of the light beam incident on the objective lens. There are also provided a magnetic circuit having a yoke carrying a magnet and adapted for driving the magnet carrying the bobbin at least in a direction parallel to the optical axis of the objective lens by the magnet and a coil mounted on the bobbin, and an optical system having a light source for radiating a light beam towards the light transmitting portion in the support holder, a mirror for deflecting the light beam radiated from the light source by 90° towards the objective lens, a beam splitter for separating the light beam radiated from the light source from a light beam incident thereon via the objective lens, and a light sensor for receiving the light beam via the beam splitter.

In still another aspect, the present invention provides an optical disc recording and/or reproducing apparatus employing a disc cartridge rotatably housing an optical disc and having an aperture of a width 1.7 mm or less and a length 24 mm or less for exposing at least a portion of a recording area of the optical disc to outside along the radius of the optical disc. The apparatus comprises an objective lens actuating device having an objective lens, a bobbin having the objective lens mounted on its one end and also having a first coil and a second coil mounted on its other end, and an elastic support having its one end mounted on the one end of said bobbin carrying the objective lens and having its other end secured to a fixation portion. The elastic support supports the bobbin for deflection in a direction parallel to the optical axis of the objective lens and in a direction normal to the optical axis. There is also provided a magnetic circuit having a yoke on which the fixation portion carrying the other end of the elastic support and the magnet are mounted. The bobbin is driven in a direction parallel to the optical axis of the objective lens and in a direction normal to said optical axis by the magnet carrying the yoke and the first and second coils mounted on the bobbin. The objective lens driving device is dimensioned to have a length along the direction of deflection of the bobbin in the direction normal to the optical axis of the objective lens equal to 8 mm or less, a length along the direction normal to the direction of deflection equal to 17 mm or less, and a height equal to 10 mm or less. There is also provided an optical system having a mirror arranged below the optical axis of the objective lens of the objective lens actuating device, a light source, a beam splitter for separating the light beam radiated from the light source from a return light from the optical disc in the disc cartridge, and a light sensor for receiving the light beam via said beam splitter as well as a pickup feed mechanism for feeding the optical pickup unit along the radius of the optical disc in the disc cartridge. The objective lens driving device is introduced into an opening in the disc cartridge for facing the recording area of the optical disc in the disc cartridge for recording and/or reproducing information signals on or from the optical disc.

In still another aspect, the present invention provides an objective lens driving device comprising an objective lens, a bobbin having the objective lens mounted on its one end and also having a first coil and a second coil mounted on its other end, and an elastic support having its one end mounted to an end of the bobbin carrying the objective lens and having a mounting portion at its other end supported by a fixation portion. The mounting portion is formed integrally with a pair of parallel supporting arms for displacing the bobbin in a direction parallel to the optical axis of the objective lens and a deflectable portion for deflecting the bobbin in a direction orthogonal to the optical axis of the objective lens. The elastic support supports the bobbin for deflection in a direction parallel to the optical axis of the objective lens and in a direction orthogonal to the optical axis of the objective lens. There is also provided a magnetic circuit having a yoke on which the fixation portion carrying the other end of the elastic support and the magnet are mounted. The bobbin is driven in a direction parallel to the optical axis of the objective lens and in a direction normal to the optical axis by the magnet carrying the yoke and the first and second coils mounted on the bobbin. A recess having a substantially U-shaped cross-section is formed in the fixation portion and a buffer material is arranged between the mounting portion of the elastic support and the recess.

According to the present invention, since the objective lens is arranged centrally with respect to the objective lens actuating device, and a coil and a magnet are arranged on one side of the objective lens, and the fixation portion of the elastic support arranged on the other side of the objective lens the objective lens actuating device may be reduced in size.

According to the present invention, the recess having a U-shaped cross-section is arranged in the fixation portion of the objective lens actuating device, and the buffer material is arranged between the recess and the mounting portion of the elastic support, it becomes possible to attenuate vibrations produced by deflections of the elastic support during bobbin driving, and the objective lens may be driven so as to optimally follow up with focusing and tracking signals.

According to the present invention, the optical pickup unit may be reduced in thickness by providing the light transmitting portion in the support holder carrying one end of the elastic support supporting the bobbin carrying the objective lens.

According to the present invention, since the recording and/or reproduction of information signals on or from the optical disc is performed by the light beam moved radially of the optical disc and radiated via the objective lens on the optical disc, with the objective lens actuating device being pre-set in the opening in the disc cartridge, the optical disc recording and/or reproducing apparatus in its entirety may be reduced in size.

DESCRIPTION OF THE INVENTION

Figure 1:
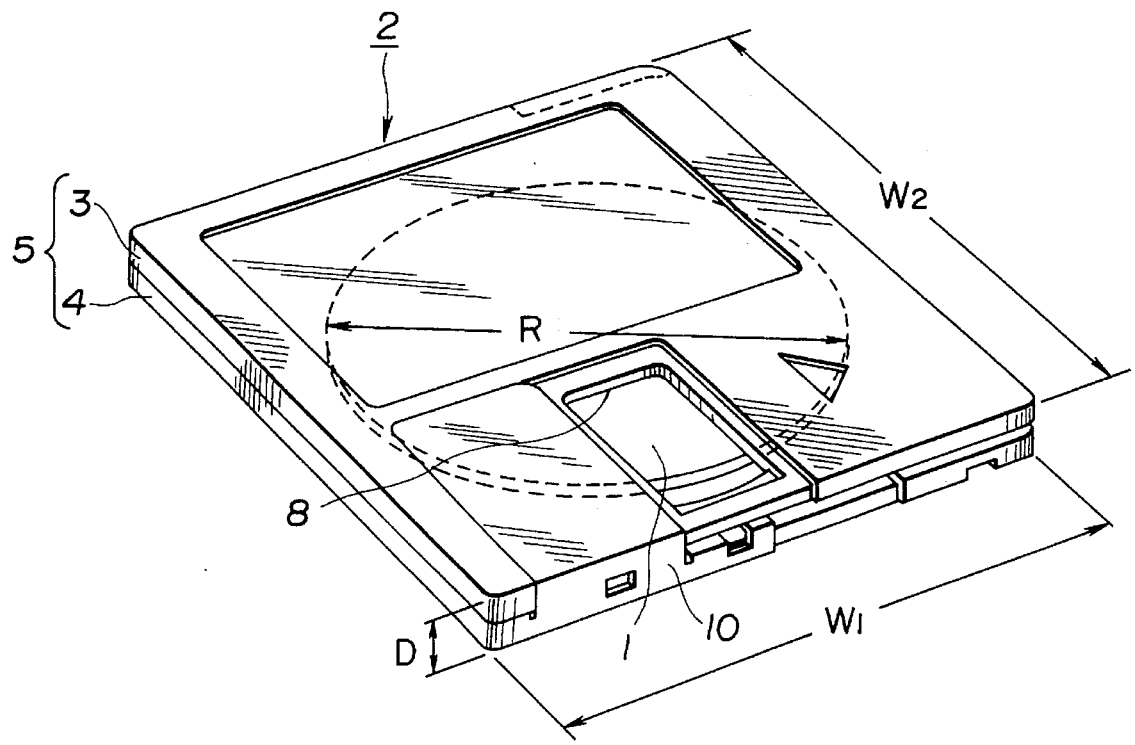
FIG. 1 is a perspective view, as seen from the upper side, of a disc cartridge employed in the optical disc recording and/or reproducing apparatus according to the present invention.
Figure 2:
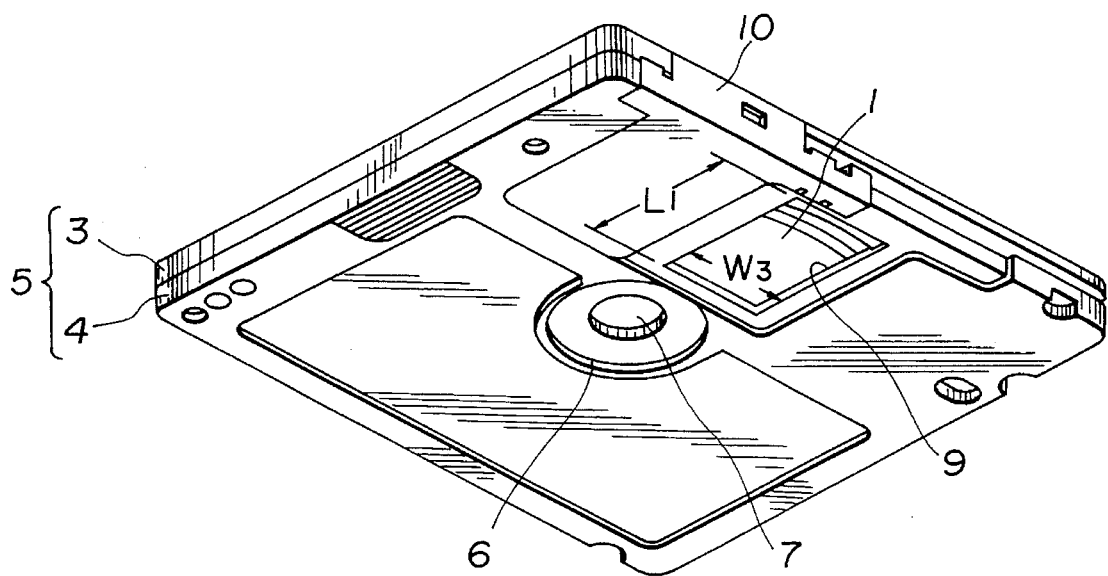
FIG. 2 is a perspective view, as seen from the bottom side, of the disc cartridge shown in FIG. 1.
Figure 3:
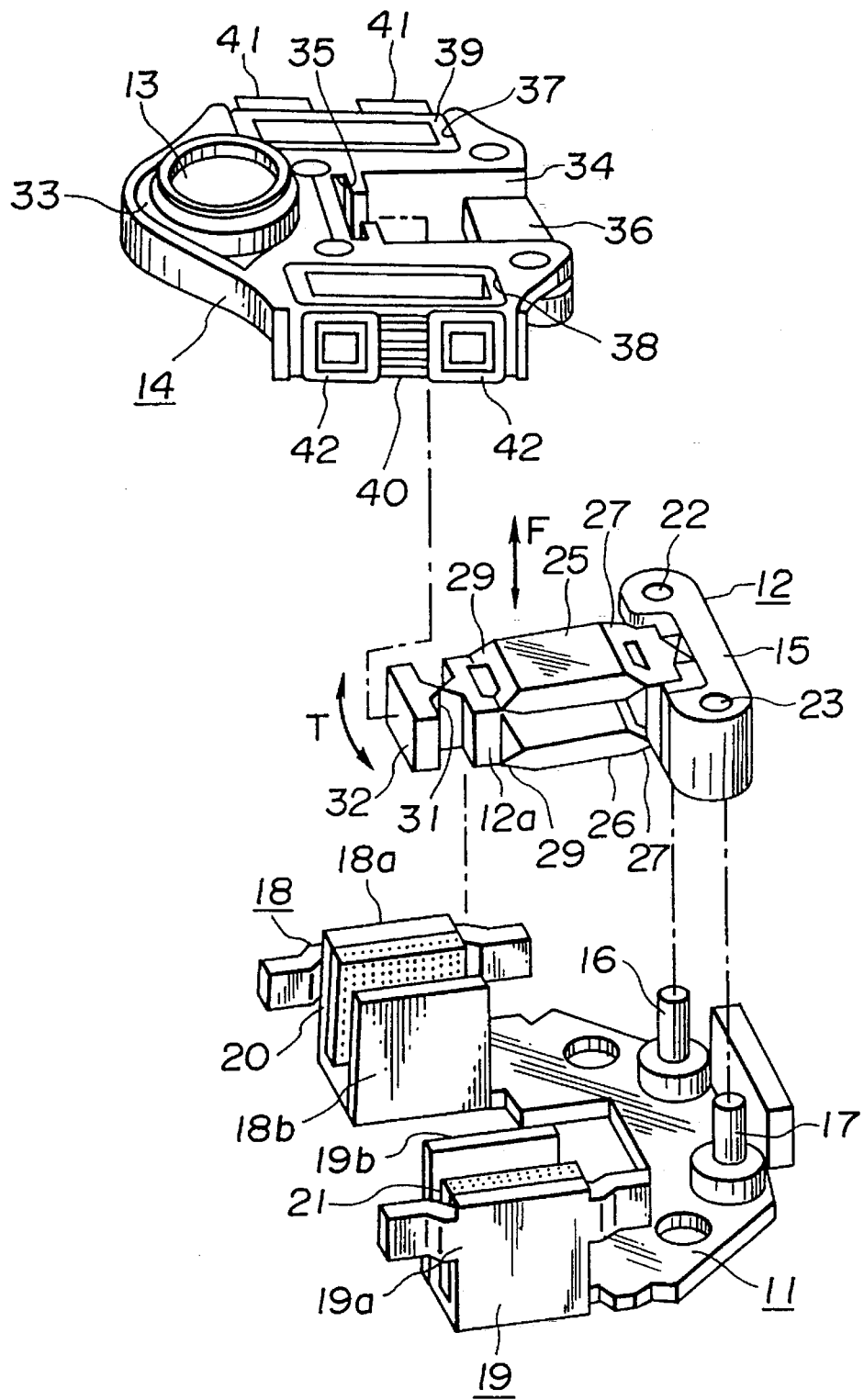
FIG. 3 is a prior art exploded perspective view showing an objective lens actuating device.
Figure 4:
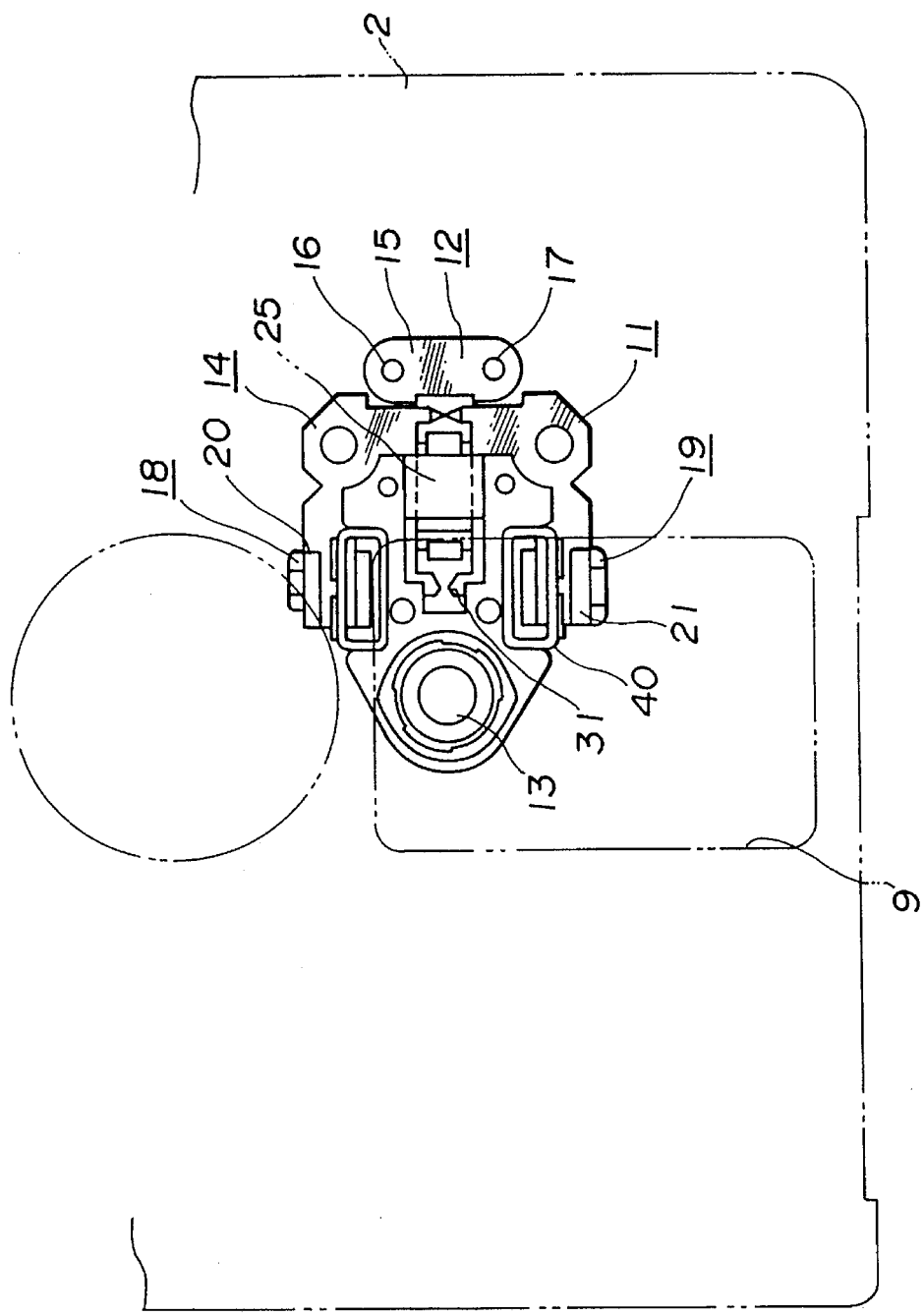
FIG. 4 is a plan view showing the state in which the objective lens actuating device shown in FIG. 3 is arranged within the optical disc recording and/or reproducing apparatus.
Figure 5:
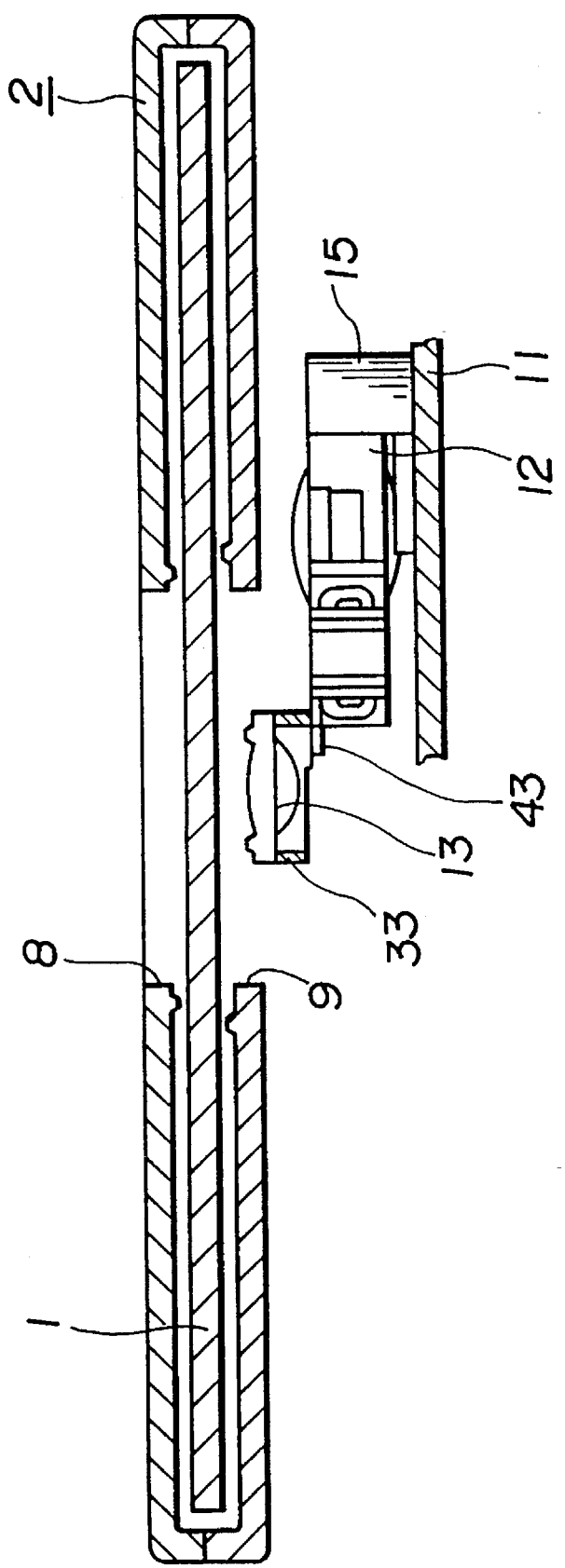
FIG. 5 is a longitudinal view showing the state in which a further prior art objective lens actuating device is arranged within the optical disc recording and/or reproducing apparatus.

Referring to the drawings, preferred embodiments of the present invention will be explained in detail.

Figure 6:
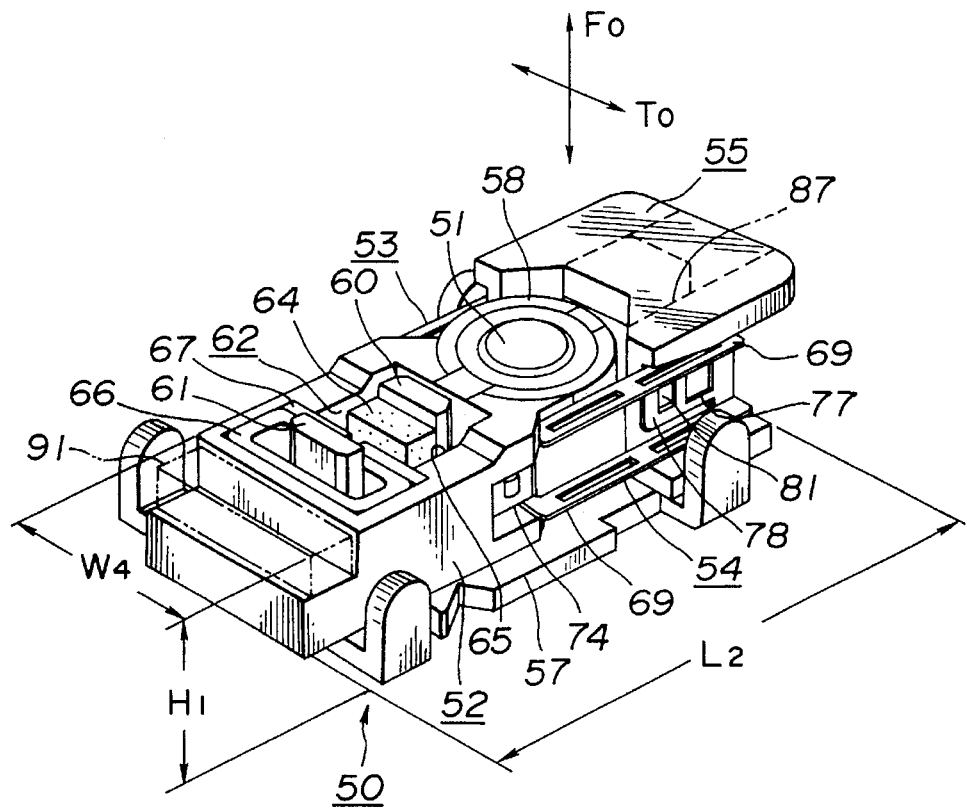
FIG. 6 is a perspective view showing an objective lens actuating device according to the present invention.

The objective lens actuating device according to the present invention is illustrated in FIG. 6 and is so designed that an objective lens 51, on which is incident a light beam radiated from a semiconductor laser as a light source and which converges and radiates the incident light beam on an optical disc, is displaced along the focusing direction parallel to the optical axis of the objective lens 51 or along the tracking direction normal to the optical axis. On the optical disc, information signals, such as music signals, are to be recorded, or recorded previously.

Figure 7:
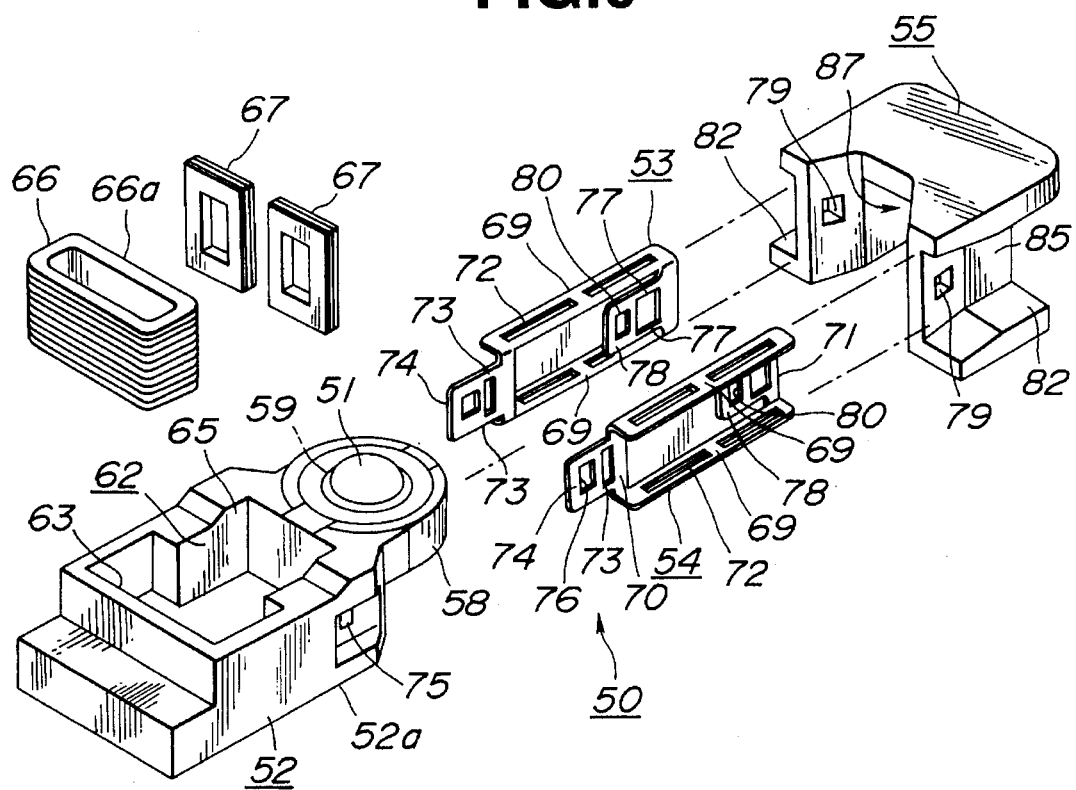
FIG. 7 is an exploded perspective view showing a bobbin mounting the objective lens, an elastic support supporting the bobbin and a support holder supporting the elastic support.
Figure 8:
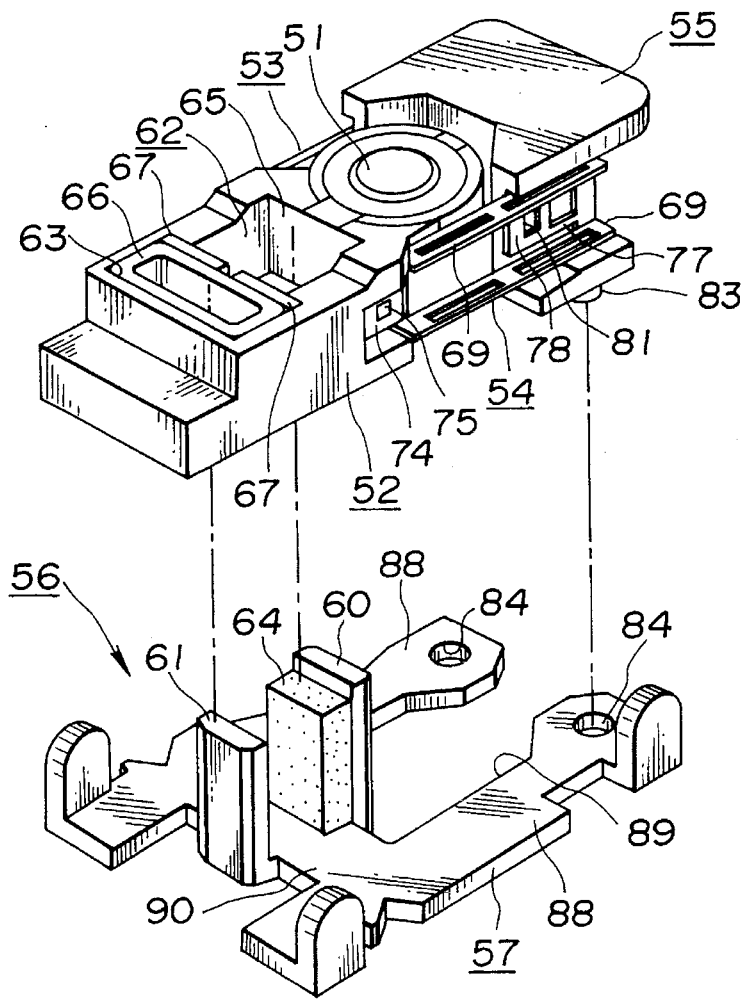
FIG. 8 is an exploded perspective view showing a magnetic circuit and a movable portion inclusive of a bobbin.

An objective lens actuating circuit 50 includes a bobbin 52 on which the objective lens 51 is mounted a pair of elastic supports 53, 54 for supporting the bobbin 52 in two mutually perpendicular directions, that is in a direction parallel to the optical axis of the objective lens 51 and in a direction normal to the optical axis, a support holder 55 for fixedly supporting the elastic supports 53, 54 and a yoke 57 constituting a magnetic circuit 56 on which to mount the support holder 55, as shown in FIGS. 6, 7 and 8. A double-sided non-spherical single lens may be employed as the objective lens.

The bobbin 52 constituting the objective lens actuating device 50 is formed of a molded product of, for example, synthetic material. An objective lens attachment portion 58 in the form of a substantially disc-shaped protrusion, is provided at an end of the bobbin 52. This objective lens attachment portion 58 protrudes upward from the upper edge of one end of a main bobbin member 52a and has a central lens attachment opening 59. The objective lens 51 is mounted so that its upper end surface is not protruded from the lens attachment opening 59 by having its outer peripheral side retained by a retention shoulder formed on the inner peripheral edge of the lens attachment opening 59.

At a mid portion of the bobbin main member 52a, there is mounted a focusing coil 66 for generating the driving force for displacing the objective lens 51 in a direction parallel to the optical axis on application of a dc magnetic field by the magnetic circuit 56, while there is formed an opening 62 into which a pair of upstanding portions 60, 61 from the yoke 57, are introduced as shown in FIGS. 7 and 8.

The focusing coil 66 is mounted in a coil attachment portion 63 in the opening 62 in the bobbin 52. This focusing coil 66 is formed by a winding in the form of a square tube substantially corresponding in size to the size of the coil attachment portion 63 so that the winding direction of the focusing coil mounted in the bobbin 52 is parallel to the optical axis of the objective lens 51, as shown in FIG. 7. The focusing coil 66 is mounted within the coil attachment portion 63 at the opposite end of the bobbin 52, as shown in FIG. 8. That is, the focusing coil 66 is fitted in the coil attachment portion 63 so that the coil 66 has its outer periphery in contact with the opposite end of the coil attachment portion 63. The focusing coil 66 is unified to the bobbin 52 by joining the outer peripheral surface of the coil to the inner peripheral surface of the coil attachment portion 63 using an adhesive.

On the outer periphery of the focusing coil 66, mounted within the coil attachment portion 63, a pair of tracking coils 67, 67 are attached for generating the driving force of displacing the objective lens 51 in a direction normal to the optical axis on application of adc magnetic field from the magnetic circuit 56. These tracking coils 67, 67 are mounted side by side on a lateral surface 66a of the focusing coil 66 which is parallel to the optical axis of the objective lens 51 and which is exposed to a magnet inserting 65 portion of the opening 62.

The tracking coils 67, 67 are mounted by winding a linear material so that, when the tracking coils are mounted on the lateral side 66a of the focusing coil 66, the focusing coil has a portion extending parallel to the optical axis of the objective lens 51 mounted on the bobbin 52. It suffices if the tracking coils are mounted so that the opposite lateral sides are linear. The tracking coils 67, 67 are mounted on the lateral side 66a of the focusing coil 66 using an adhesive.

The elastic supports 53, 54 support the bobbin 52 for displacement in two mutually perpendicular directions, that is in a direction parallel to the optical axis of the object lens 51 and in a direction perpendicular to the optical axis. The elastic supports 53, 54 are formed by punching and bending a thin elastic metal plate. These elastic supports 53, 54 are provided with a pair of parallel support arms 69, 69, each formed as an elongated plate, as shown in FIG. 7. These parallel supporting arms 69, 69 are connected at one and at opposite ends thereof by connection portions 70, 71 and have their broad surfaces lying in a plane orthogonal to these connecting portions 70, 71. Consequently, these parallel supporting arms 69, 69 are elastically deflectable only in a direction in which they are connected to the connecting portions 70, 71, while they are not elastically deflectable in directions orthogonal to the direction in which they are connected to the connecting portions 70, The supporting arms 69, 69 are formed at mid portions thereof with punched holes for adjusting the elastic force of the supporting arms 69, 69.

Plate-shaped bobbin supporting portions 74 are protruded via a pair of parallel elastic deflecting portions 73, 73 from lateral edges of one of the connecting portions 70 provided on lateral sides of the parallel supporting arms 69, 69. In each of these bobbin supporting portions 74, there is bored a fitting opening 76 engaged by a fitting protrusion 75 formed on each side of the end face of the bobbin mounting portion 52a provided with the objective lens attachment portion 58.

The elastic supports 53, 54 are mounted in position on both lateral sides of the bobbin 52 carrying the objective lens 51 via the bobbin supporting portions 74 by fitting the protrusions 75 in the fitting openings 76, as shown in FIG. 7. The bobbin 52 is fixed by the protrusions 75 becoming crushed to prevent the elastic supports 53, 54 from being disengaged from the fitting openings 76.

For securing the elastic supports 53, 54 in position within the bobbin 52, a separate fixation member, not shown, may also be employed. That is, a fitting opening is provided in place of the engaging protrusion 75. The fitting opening 76 bored in the bobbin support 74 are brought into registration with the fitting opening bored in the bobbin 52 and the fixation member is inserted into these openings for securing the elastic supports in position with respect to the bobbin 52.

Plate-shaped mounting portions 78 are formed on the lateral edges of the connecting portion 71 (connecting the parallel supporting arms 69, 69 of the elastic supports 53, 54) via a pair of elastic deflecting portions 77, 77 extending in the direction of extension of the parallel supporting arms 69, 69. These mounting portions act as stationary supports for the support holder 55. These mounting portions 78 are formed with mounting holes 80, 80 brought into registration with positioning holes 79, 79 bored in the opposite lateral sides of the support holder 55 mounted on the yoke 57 constituting the magnetic circuit 56.

The elastic supports 53, 54 are secured in position to both lateral sides of the support holder 55 by fixation members 81, 81 inserted into the mounting openings 80, 80 in registration with the positioning openings 79, 79.

The support holder 55, for fixedly supporting the mounting portions 78 of the elastic supports 53, 54 making up the mounting portions for the opposite ends of the elastic supports 53, 54, are provided with support mounting portions 82, 82 on opposite lateral sides having the positioning openings 79, 79 for securing the mounting portions 78 and a pair of fitting protrusions 83, 83 on its bottom surface acting as fixation portions for the yoke 57, as shown in FIGS. 6 and 8. The support holder 55 is mounted on the yoke 57 by fitting the protrusions 83, 83 in the fitting openings 84, 84 bored in the opposite ends of the yoke 57.

Figure 9A:
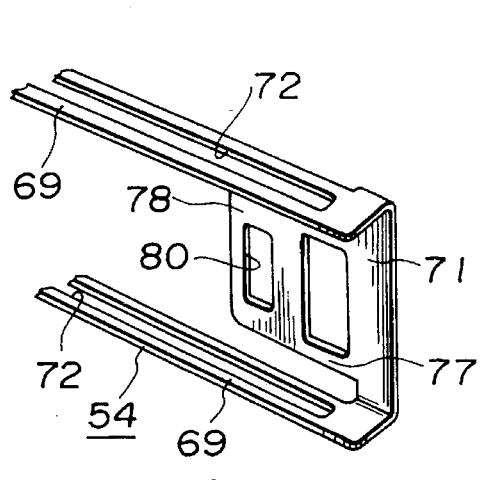
FIGS. 9A and 9B are fragmentary enlarged perspective views showing a support holder fixedly carrying the opposite end of an elastic support, with the opposite end of the elastic support being shown in a partial enlarged view.
Figure 9B:
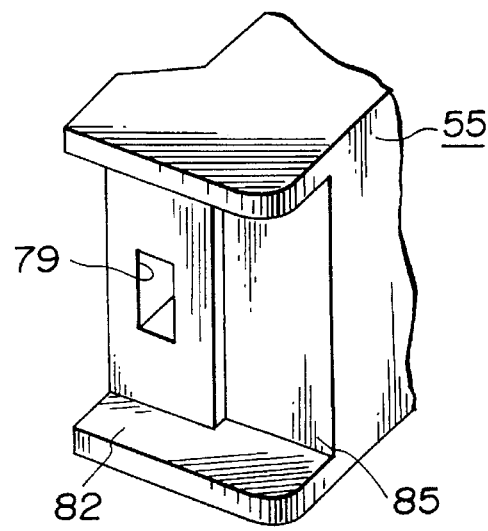
Figure 10:
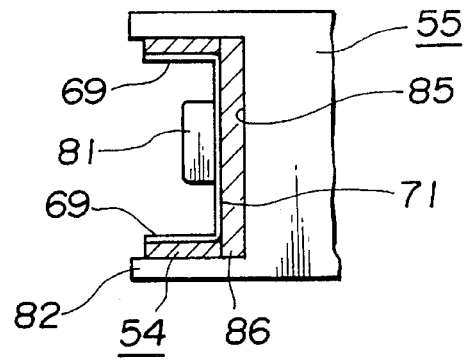
FIG. 10 is a cross-sectional view showing the state in which a buffer member is arranged between the elastic support and a recess formed in the support holder.

The support mounting portions 82, 82 provided on both sides of the support holder 55 form recesses 85, 85 each having a U-shaped cross-section, as shown in FIGS. 9A, 9B and 10. These recesses 85, 85 are formed facing the connecting portion 71 and the elastic deflectable portions 77, 77 formed at the opposite ends of the elastic supports 53, 54 located at the support mounting portions 82, 82. A buffer member 86 formed of a visco-elastic material is arranged between the connecting portion 71 and the elastic deflectable portions 77, 77 of the elastic supports 53, 54 and the recesses 85, 85, as shown in FIG. 10. The buffer member 86 plays the role of preventing resonant vibrations produced on elastic displacement of the elastic supports 53, 54 or promptly attenuating the vibrations. That is, the buffer member 86 plays the role of attenuating resonance or vibrations of the elastic supports 53, 54 transmitted thereto via the connecting portion 71.

The buffer member 86 is formed of visco-elastic synthetic material. That is, the buffer member 88 is a piece of visco-elastic synthetic material charged in a space between the connecting portion 71 and the elastic deflectable portions 77, 77 on one hand and the recesses 85, 85 on the other hand. Above all, a UV curable resin is preferably employed as the material for the buffer member 86. That is, with the UV curable resin, desired values of the visco-elasticity may be selected by controlling the amount of irradiation of UV rays. Consequently, by controlling the amount of the UV rays radiated on the UV curable resin charged in the space between the connecting portion 71 and the elastic deflectable portions 77, 77 on one hand and the recesses 85, 85 on the other hand, it becomes possible to provide the buffer member 88 having desired visco-elasticity for attenuating the resonance or vibrations of the elastic supports 53, 54.

The support holder 55, supporting the ends of the elastic supports 53, 54, carrying the bobbin 52 at its opposite ends, has a light-transmitting portion 87 for transmitting the light beam incident on the objective lens 51 mounted on the bobbin 52. The light transmitting portion 87 is provided in the support holder 55 extending in a direction normal to the optical axis of the objective lens 51 mounted on the bobbin 52. That is, the light transmitting portion 87 is formed in the support holder 55 extending parallel to the direction of extension of the elastic supports 53, 54, and consists of a through-hole across the front and rear surfaces of the support holder 55.

The light transmitting portion 87 may also be formed by forming a recessed cut-out from the bottom surface of the support holder 55 provided with the fitting protrusions 83, 83.

Figure 11:
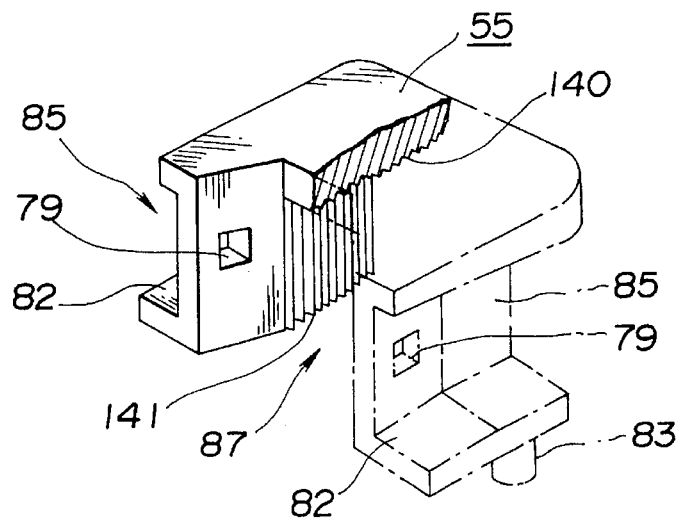
FIG. 11 is a perspective view showing the state in which the inner wall surface of a light transmitting portion of the support holder is formed by a ragged surface, with a portion being cut away.

The light transmitting portion 87 of the support holder 55 plays the roll of decreasing the amount of the light beam reflected by the inner wall surface of the transmitting portion 87 for eliminating the stray light in the light path of the light beam transmitted through the support holder 55. The inner wall surface of the light transmitting portion 87 has its top surface wall 140 and its lateral side walls 141 ragged or serrated in order to render it difficult for the incident light beam component impinging on the top wall surface and the side wall surfaces 141 to be reflected into the light path of the light beam transmitted through the support holder 55, as shown for example in FIG. 11. Consequently, the portion of the incident light beam directed towards the inner wall surface of the light transmitting portion 87 is reflected by the inner wall surface in a reduced amount thereby decreasing the amount of the stray light volume.

Figure 12:
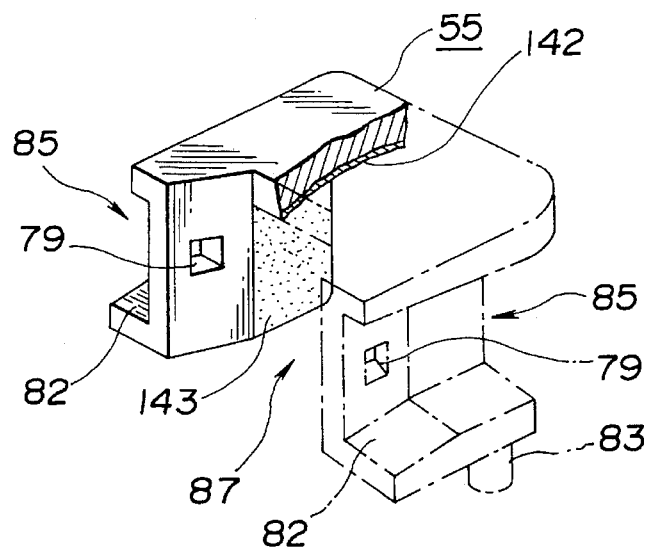
FIG. 12 is a perspective view showing the state in which the inner wall surface of the light transmitting portion of the support holder has a light absorbing layer, with a portion being cut away.

The inner wall surface of the light transmitting portion 87 may also be provided with light absorbing layers of high light absorption efficiency 142, 143 by coating a block-tinted paint on the top wall surface and the side wall surfaces as shown for example in FIG. 12. Thus the portion of the incident light beam on the light transmitting portion 87 which is directed to the inner wall surface of the light transmitting portion 87 is absorbed by the light absorbing layers 142, 143 deposited on the inner wall surface for decreasing the stray light volume.

The support holder 55 having the light transmitting portion 87 may also be molded of a transparent or light-transmitting polycarbonate resin, in which case the portion of the incident light beam on the support holder 55 passing onto the inner wall surface is directly transmitted to outside. Consequently, the light beam directed to the inner wall surface and reflected within the light transmitting portion 87 is decreased for decreasing the stray light volume.

Thus the reflected volume of the incident light beam on the light transmitting portion 87 directed to the inner wall surface of the light transmitting portion 87 is reduced so that the incident light on the light transmitting portion 87 is passed through the light transmitting portion 87 so as to fall on the objective lens 51 is a stable state. Consequently, the light transmitting portion 87 provided in the support holder 55 suffers to a lesser extent from the phenomenon of the stray light beam outgoing from the light source in the above-mentioned finite optical system.

The yoke 57, mounted integrally with the support holder is formed of a high magnetic permeability material, such as silicon steel, and includes a pair of arms 88, 88 connected by a connecting portion 90, as shown in FIG. 8. The opposite ends of the arms 88, 88 are formed with fitting openings 84, 84 engaged by engaging protrusions 83, 83 provided on the support holder A pair of upstanding portions 80, 81 are formed facing each other on opposite sides of the connecting portion 90 interconnecting the arms 88, 88. The magnet 84 is mounted on the surface of the upstanding portion 80 facing the upstanding portion 81 for constituting the magnetic circuit 56.

The gap 89 defined between the arms 88 and 88 across the opposite side of the yoke 57 and the connecting portion 90 plays the part of transmitting the light beam outgoing from the semiconductor laser as the light source and the return light beam reflected from the optical disc 1 when the optical pickup unit is completed in a manner as will be explained subsequently.

When the support holder 55 is mounted by fitting the fitting protrusions 83, 83 in the fitting openings 84, 84 formed in the yoke 57 constituting the magnetic circuit 56, the opposite side upstanding portion 61 of the yoke 57 is introduced into the tubular focusing coil 66 mounted on the bobbin 52 in turn mounted on one side of a pair of the elastic supports 53, 54 having its other side supported by the support holder 55, as shown in FIG. 6. The upstanding portion 60 is introduced along with the magnet 64 into the magnet inserting portion 65 formed in the bobbin 52. The upstanding portions 60, 61 face each other, with the focusing coil 66 and the tracking coils 67, 67 in-between, for completing the magnetic circuit traversing the focusing coil 66 and the tracking coils 67, 67.

With the above-described objective lens actuating device 50, when the driving current corresponding to the focusing error signal is supplied to the focusing coil 66, a driving force is produced in a direction parallel to the optical axis of the objective lens 51 mounted on the bobbin 52 by the magnetic flux emanating from the magnet 64 and the current flowing through the focusing coil 66, as indicated by an arrow $F_0$ in FIG. 6. By the generated driving force, the objective lens 51 is displaced, along with the bobbin 52, in a direction parallel to the optical axis of the objective lens, as indicated by an arrow $F_0$ in FIG. 6. The elastic supports 53, 54, supporting the bobbin 52 carrying the objective lens 51 are elastically deflected in a direction at right angles to the direction of extension of the supporting arms 69, 69 via parallel supporting arms 69, 69 having one end supported by the support holder 55. As a result, the objective lens 51 is displaced in a direction parallel to its optical axis.

When the driving current corresponding to the tracking error signal is supplied to the tracking coils 67, 67, a driving force is produced in a direction orthogonal to the optical axis of the objective lens 51 mounted on the bobbin 52 by the magnetic flux emanating from the magnet 64 and the current flowing through the portions of the tracking coils 67, 67 extending parallel to the optical axis of the objective lens 51, as indicated by an arrow $T_0$ in FIG. 6. By the generated driving force, the objective lens 51 is displaced, along with the bobbin 52, in a direction orthogonal to the optical axis of the objective lens, as indicated by an arrow $T_0$ in FIG. 8. The elastic supports 53, 54 induce elastic deflection of the elastic deflecting portions 73 integrally connected to the bobbin supporting portion 74 and the elastic deflecting portions 77, 77 integrally connected to the mounting portion 78. As a result, the objective lens 51 is displaced in a direction perpendicular to its optical axis.

With the above-mentioned objective lens driving device 50, a balance 91 is occasionally mounted at the opposite end of the bobbin 52 for achieving weight balance of the bobbin 52 supported in a cantilevered fashion by the elastic supports 53, 54. The balance 91 may be omitted if the objective lens 51 employed is small-sized and light in weight.

The overall size of the above-described objective lens actuating device 50 is selected in the following manner. That is, the width $W_4$ of deflection of the bobbin 52 in a direction perpendicular to the optical axis of the objective lens 51 is set to 8 mm or less, and the length $L_2$ of the bobbin 52 in the tangential direction or in a direction normal to the direction of displacement is set to 17 mm or less, while its height $H_1$ is set to 10 mm or less. With the objective lens actuating device 50 according to the present invention, dimensioned as described above, it is possible for the light beam 1 radiated via the objective lens 51 to scan the signal recording area of the optical disc 1 by the light beam radiated via the objective lens 51, with the objective lens driving device 50 being inserted in the recording/reproducing aperture 9 of the disc cartridge 2 housing the optical disc 1 (64 mm in diameter). That is, the objective lens driving device 50 may be inserted into the recording/reproducing aperture 9 with its tangential direction parallel to the width $W_3$ of the recording/reproducing aperture 9 and with the objective lens 51 deflectable in the tracking direction of the optical disc 1. In the present embodiment, the objective lens actuating device is arranged so that it has the width $W_4$ in the tracking direction equal to 8 mm, the tangential length $L_2$ equal to 17 mm and the height $H_1$ equal to 10 mm.

Figure 13:
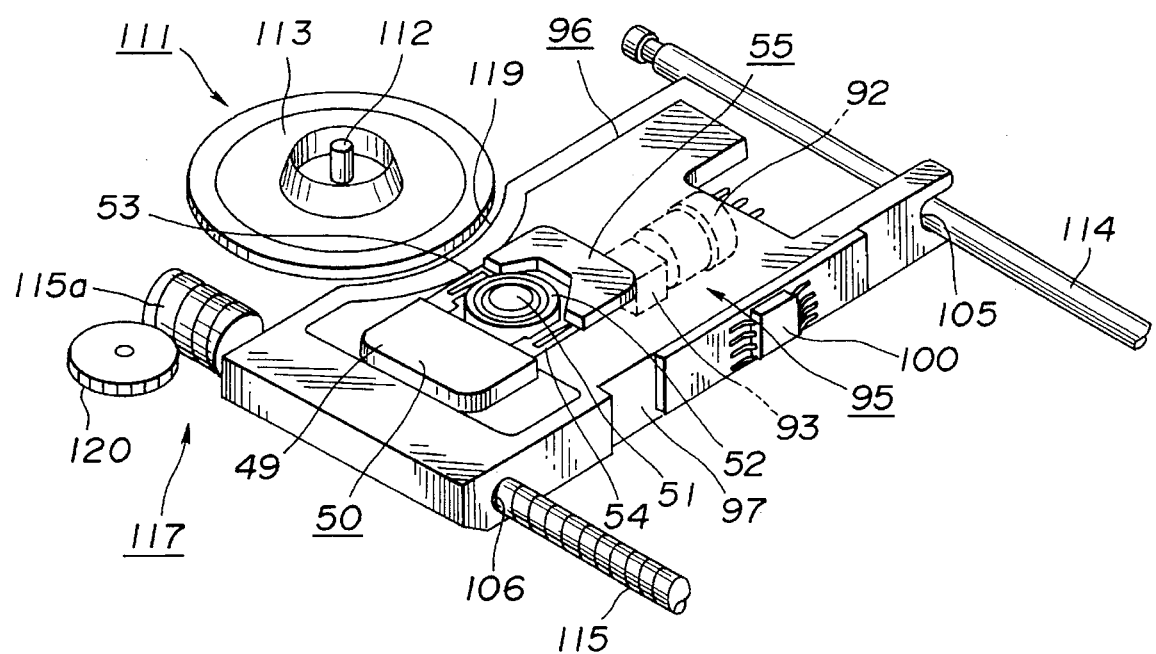
FIG. 13 is a perspective view showing an optical pickup device according to the present invention.

The upper end surfaces of the upstanding portions 60, 60 making up the yoke 57 are formed with stop members 49 which inhibits extraction of the bobbin 52 upwards from the magnetic circuit 56 when the objective lens 51 is displaced in a direction parallel to the optical axis, as shown in FIG. 13.

Figure 14:
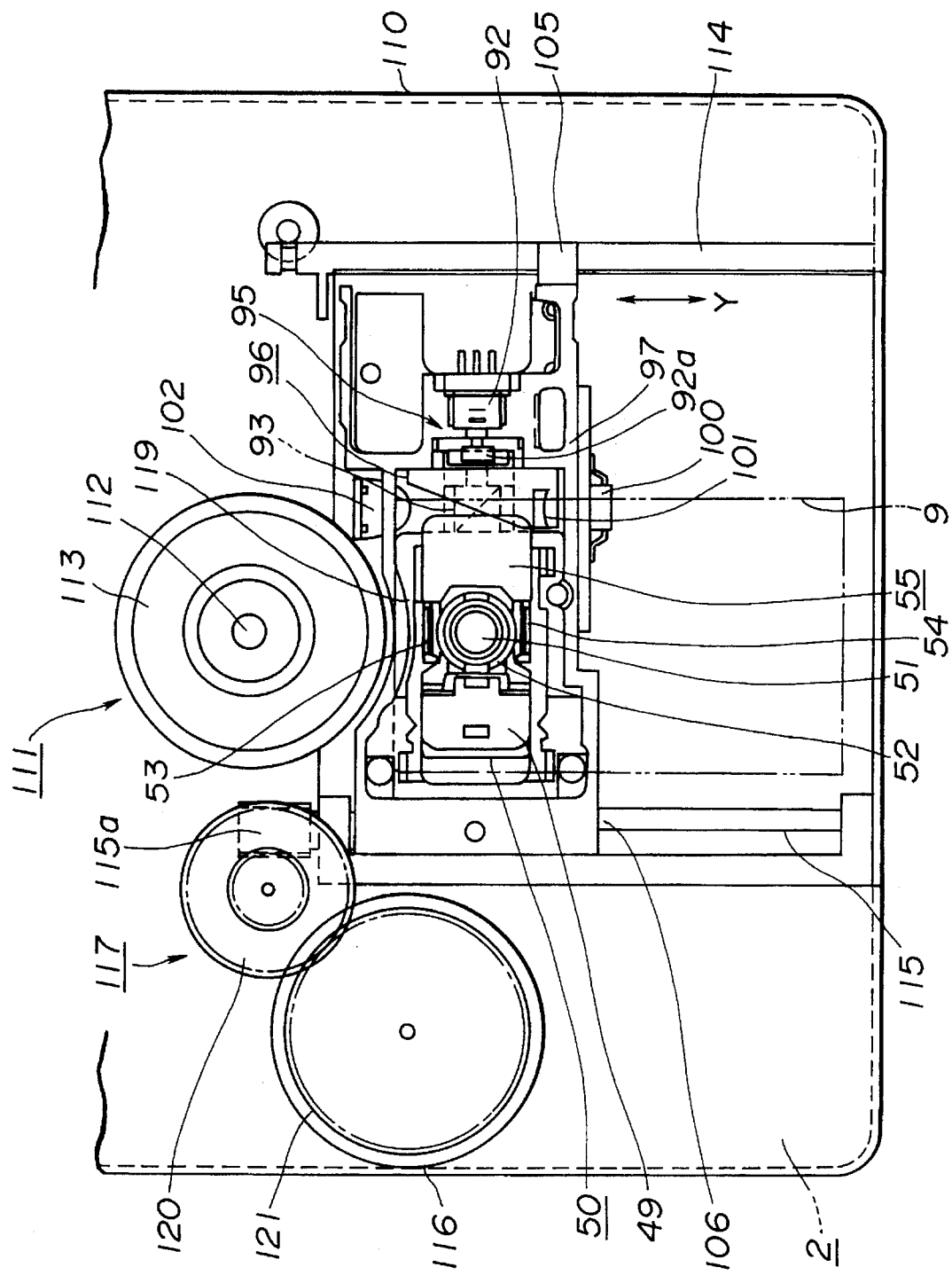
FIG. 14 is a partial plan view showing an optical disc recording and/or reproducing apparatus having the optical pickup unit according to the present invention.

The above-described objective lens actuating device 50 is combined with an optical block 95, comprising optical components, such as a semiconductor laser 92 as a light source for radiating the light beam, and a beam splitter 93, to constitute an optical pickup unit 96, as shown in FIGS. 13 and 14.

The optical pickup unit 96 has a mounting base 97 as a base member on which to support the objective lens driving device 50. The objective lens actuating device 50 is mounted on the optical pickup unit 98 by having the bottom of the yoke 57 of the magnetic circuit 56 supported on the mounting base 97. The semiconductor laser 92 for radiating the light beam onto the objective lens 51 is mounted on one end of the mounting base 97. The semiconductor laser 92 is mounted on the mounting base 97 so that it has its beam radiating surface facing the light transmitting portion 87 formed in the fixation portion 55 of the objective lens driving device 50, with the optical axis direction of the outgoing light beam extending perpendicular to the optical axis of the objective lens 51. The mounting base 97 is guided in a direction parallel to the surface of the optical disc 1 by a feed guide shaft and a feed screw as later explained.

Figure 16:
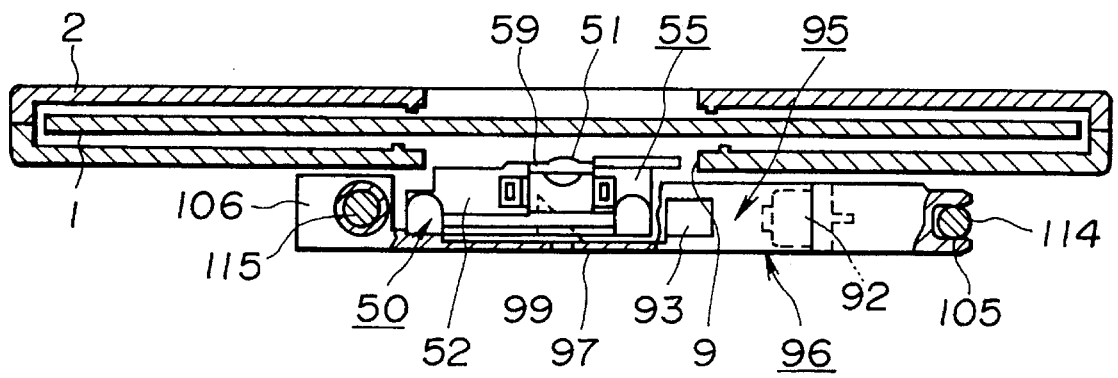
FIG. 16 is a longitudinal view of an optical disc recording and/or reproducing apparatus showing the state in which the optical pickup unit according to the present invention is arranged within the optical disc recording and/or reproducing apparatus.

On the mounting base 97 is attached a reflecting mirror 99 whereby the light beam outgoing from the semiconductor laser 92 and transmitted via the light transmitting portion 87 is bent at a right angle to fall on the objective lens 51, as shown in FIG. 14. The reflective mirror 99 is mounted on the mounting base 97 below the objective lens 51 so that the center of the reflective surface thereof is coincident with the optical axis of the objective lens 51. The mounting base 97 has a surface orthogonal to the optical axis of the objective lens 51, that is a surface parallel to the surface of the optical disc 1, and a variety of optical devices, such as the above-mentioned objective lens actuating device 50, laser 92 or the mirror 99, are mounted on this surface, as shown in FIG. 16.

The light transmitting portion 87 of the support holder 55 has its inner wall surface formed as a serrated or ragged surface or coated with the light absorbing layer, as described above. Alternatively, the support holder 55 is molded from a transparent resin. As a result, the light beam radiated by the semiconductor laser 92 towards the inner wall surface is reflected thereat to a significantly reduced extent before being radiated to the reflective mirror 99.

Figure 15:
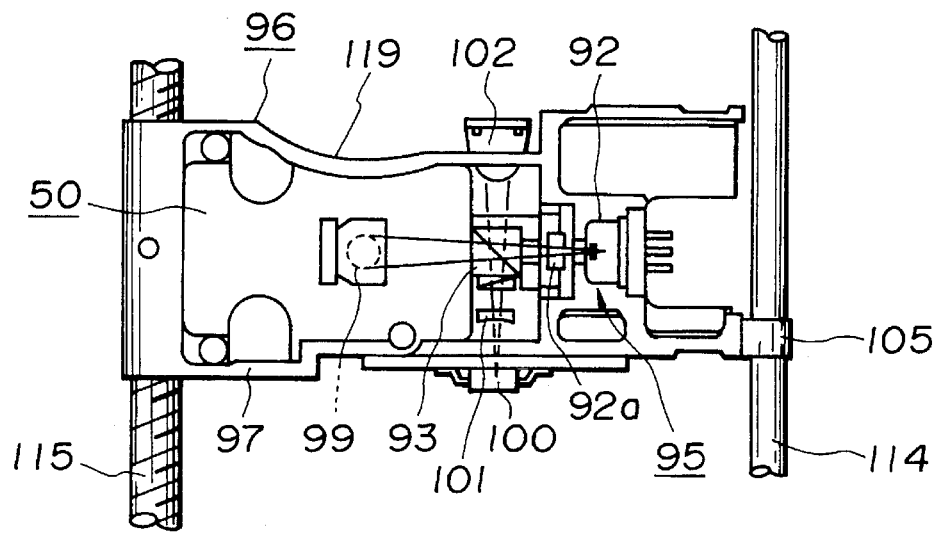
FIG. 15 is a bottom plan view of the optical pickup device according to the present invention.

On the mounting base 97 is arranged a grating 92a facing the radiating surface of the semiconductor laser 92, as shown in FIGS. 14 and 15. The beam splitter 93 is arranged between the grating 92a and the reflective mirror 99. The beam splitter 93 may for example be a polarized beam splitter for splitting the light beam radiated by the semiconductor laser 92 from the return light beam from the optical disc incident on the beam splitter via the objective lens 51.

The return light beam incident on the beam splitter 93 is taken out of the beam splitter 93 by bending the light path of the return light beam by 90° with respect to the optical axis of the incident light beam radiated from the semiconductor laser 92. A light sensor 100, such as a photodetector, is mounted on a side of the mounting base 97 for receiving the return light beam split by the beam splitter 93 for detecting the information signals, focusing error signals and tracking error signals recorded on the optical disc. The light sensor 100 is mounted with its light receiving surface facing the optical axis of the return light beam after being split by the beam splitter 93.

A multiple lens 101 for waveshaping the return light beam split and reflected from the beam splitter 93 is mounted between the beam splitter 93 and the light sensor 100.

The beam splitter 93 has the function of separating a portion of the incident light beam from the semiconductor laser 92, as shown in FIG. 15. The beam splitter 93 outputs a portion of the incident light beam radiated from the semiconductor laser 92 after bending its light path at a right angle in an opposite direction to the return beam direction. This portion of the incident light beam, split by the beam splitter 93, is employed for controlling the output of the semiconductor laser 92. To this end, a light sensor 102 for detecting the portion of the incident light beam split by the beam splitter 93 is mounted on the opposite side of the mounting base 97. A control signal for controlling the output of the semiconductor laser 92 is produced and outputted based on the detection signal from the light sensor 102.

The optical components making up the optical block 95 arranged on the mounting base 97 of the above-described optical pickup unit 96, that is the semiconductor laser 92, the reflective mirror 99, the beam splitter 93, the light sensor 100 for receiving the return light split from the light beam radiated from the semiconductor laser via the beam splitter 93, and the light sensor 102 for receiving a portion of the light beam radiated by the semiconductor laser 92, are arranged in a plane parallel to the optical axis of the light beam extending from the semiconductor laser 92 of the mounting base 97 as far as the reflective mirror 99, as shown in FIG. 16. The surface defined by the optical axis of the light beam reaching the reflective mirror 99 from the semiconductor laser 92 of the mounting base 97 is a plane parallel to the optical disc surface, as mentioned above.

By arranging the optical components making up the optical block 95, such as the semiconductor laser 92 or the beam splitter 93, the optical pickup unit 96 may be reduced in size.

In addition, the reflective mirror 99 is arranged below the objective lens actuating device 50, and the respective components are arranged in a plane parallel to the optical axis of the light beam reaching the reflective mirror 99 from the semiconductor laser 92. As a result, the objective lens actuating device 50 is arranged above the optical block 95 of the mounting base 97 and is protruded in a direction parallel to the optical axis of the objective lens 51 beyond the optical pickup unit 96 in its entirety. That is, since only the objective lens actuating device 50 is protruded upward, the objective lens actuating device 50, dimensioned as described above, may be positively inserted into the recording/reproducing apertures 9 formed in the disc cartridge 2 housing the optical disc 1 (64 mm in diameter), as shown in FIG. 16.

On a lateral side of the mounting base 97 of the optical pickup 96, arranged as described above, there is formed a guide bearing 105 for engaging with a feed guide shaft 114 provided in the optical disc recording and/or reproducing apparatus, as shown in FIG. 13. On the opposite lateral side of the mounting base 97 is provided a feed screw guide portion 106 for engaging with a feed screw 115 similarly provided in the optical disc recording and/or reproducing apparatus.

Such optical pickup unit 96 is applied to an optical disc recording and/or reproducing apparatus in which the disc cartridge 2 containing the optical disc 1 (64 mm in diameter) has the recording/reproducing apertures 8, 9 formed in the cartridge main body 5, with each of the recording/reproducing apertures 8, 9 being of the length $L_1$ along the radius of the optical disc 1 (being 24 mm) and of the width $W_2$ being 17 mm.

The optical disc recording and/or reproducing apparatus has a rotational disc actuating device 111 for rotationally driving the optical disc 1 contained in the disc cartridge 2 loaded in a cartridge loading unit 110 arranged within the main body of the apparatus. The rotational disc actuating device 111 has a disc table 113 arranged at a mid portion of the main body of the apparatus and attached to a distal end of a centrally arranged driving shaft 112 for clamping to the optical disc 2 for being rotated in unison with the disc, as shown in FIG. 14.

Within the inside of the optical disc recording and/or reproducing apparatus, there are mounted a feed guide shaft 114 for guiding the optical pickup unit 96 and a feed screw 115 in parallel to each other. The feed guide shaft 114 and the feed screw 115 make up a pickup feed unit 117 along with a pickup feed motor 116 running the feed screw 115 in rotation. The feed guide shaft 114 and the feed screw 115 are arranged on a chassis, not shown, arranged within the main body of the apparatus, and are located on both lateral sides of the recording/reproducing apertures 8, 9 of the disc cartridge 2, loaded on the cartridge loading unit 110 by clamping the optical disc 2 on the disc table 113, in parallel with the radial direction of the disc.

The optical pickup unit 96 has the feed guide shaft 114 inserted into the guide bearing 105 on its one side, while having the feed screw 115 inserted in the feed screw engaging portion 106 on its other side.

The objective lens actuating device 50 is arranged within the optical disc recording and/or reproducing apparatus, with the elastic supports 53, 54 extending in or along the tangential direction of the recording track formed in the optical disc 1, as shown in FIG. 14. That is, the objective lens actuating device 50 is arranged in the optical disc recording and/or reproducing apparatus with its longitudinal direction aligned with the tangential direction. The optical block 95 is arranged with the line formed between the semiconductor laser 92 and the reflective mirror 99 parallel to the tangential direction (direction tangential to the recording track formed in the optical disc 1).

The optical pickup unit 98 is arranged at this time within the optical disc recording and/or reproducing apparatus so that the objective lens driving device 50 mounted on the mounting base 97 constituting the optical pickup unit 96 is at a height at which the objective lens mounting device is capable of being introduced into the recording/ reproducing apertures 9 of the disc cartridge 2 loaded in the cartridge loading unit 110. That is, the optical pickup unit 98 is arranged in the main body of the apparatus so that, when the disc cartridge 2 is loaded on the cartridge loading unit 110 with the optical disc 1 being clamped on the disc table 113, the object lens actuating device 50 is introduced into the recording/reproducing apertures 9 so that at least the objective lens 51 faces the recording area of the optical disc 1. The optical pickup unit 98 is mounted in the main body of the apparatus at such a height level that, even if the objective lens 51 has been displaced in the focusing direction, the optical pickup unit 98 is not contacted with the optical disc 1, that is, has a pre-set working distance from the optical disc 1. In other words, the optical pickup unit 98 is supported by the feed guide shaft 114 and the feed screw 115 at such a height level that, when the objective lens 51 is displaced along the focusing direction, it is not abutted against the optical disc surface.

By arranging the optical pickup unit 96 in this manner within the main body of the apparatus, it becomes possible to reduce the distance between the objective lens 51 and the optical disc 1, that is the so-called working distance, in order to reduce the size and weight of the objective lens 51.

Thus the optical pickup unit 98 arranged in the main body of the apparatus may be fed as indicated by arrow Y in FIG. 14 across the inner and outer rims of the disc 1 by the feed screw 115 being run in rotation by the pickup feed motor 116.

Meanwhile, a worm gear 115a formed at an end of the feed screw 115 is engaged with a drive transmitting gear 120 of a speed-reducing gearing meshing with a gear 121 run in rotation by the pickup fed motor 116. The feed screw 115 is connected via the speed-reducing gearing to the pickup feed motor 116 and thereby run in rotation.

The opposite lateral side of the optical pickup unit 98 in the main body of the apparatus, by which the optical pickup unit faces the rotational disc driving unit 111, is formed with a recess 119 for clearing the disc driving unit 111. The recess 119 plays the role of positively feeding the optical pickup unit 96 up to the inner rim of the disc 1 without abutting against the disc driving unit 111 in order to scan the inner most recording area portion of the disc 1 with the light beam. By providing the recess 119 for clearing the disc driving unit 111 in the optical pickup unit 96, it becomes possible to employ a sufficiently large-sized disc driving unit 111 in order to assure stable disc rotation.

Figure 17:
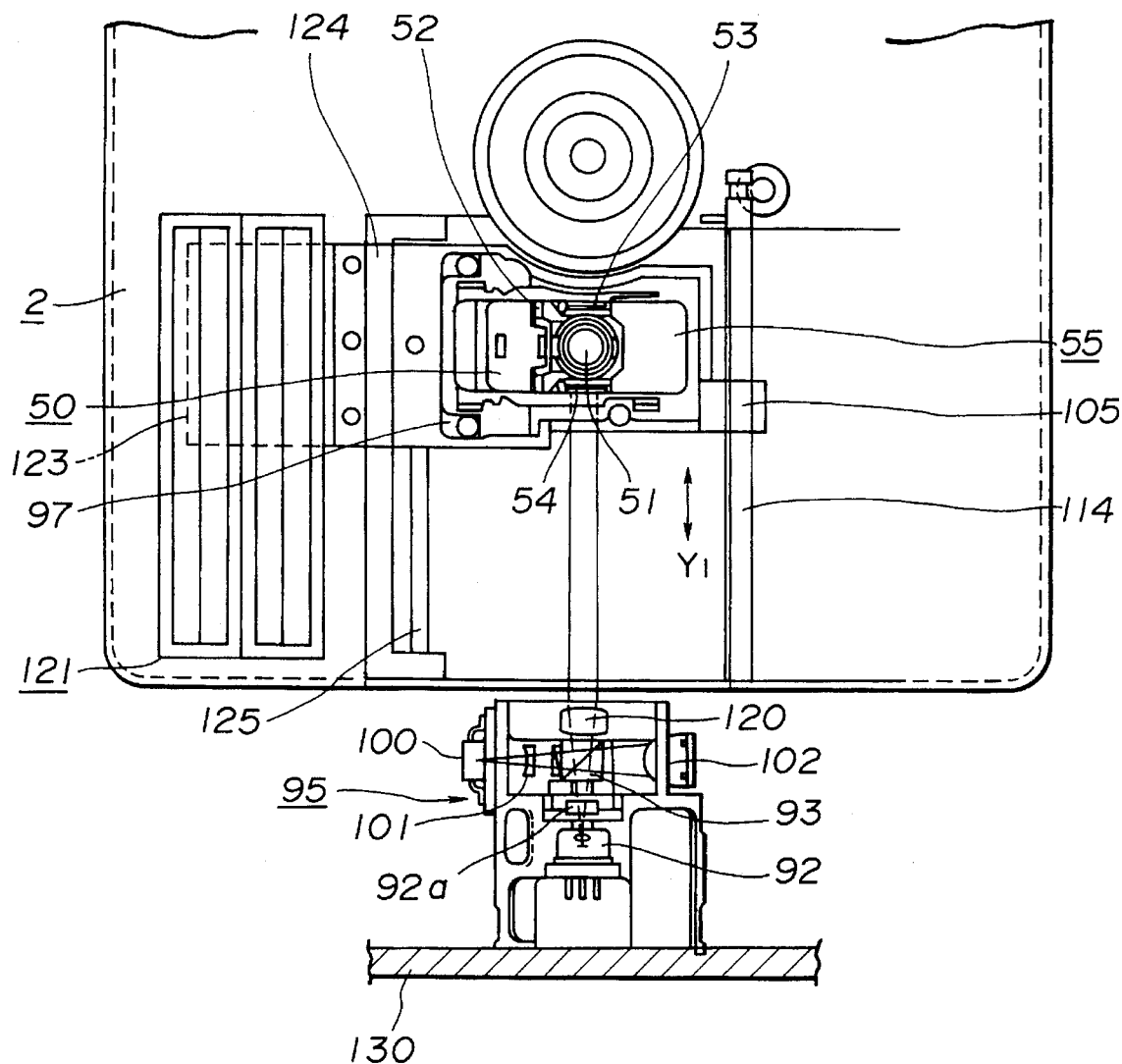
FIG. 17 is a partial plan view showing a modification of the optical disc recording and/or reproducing apparatus according to the present invention.
Figure 18:
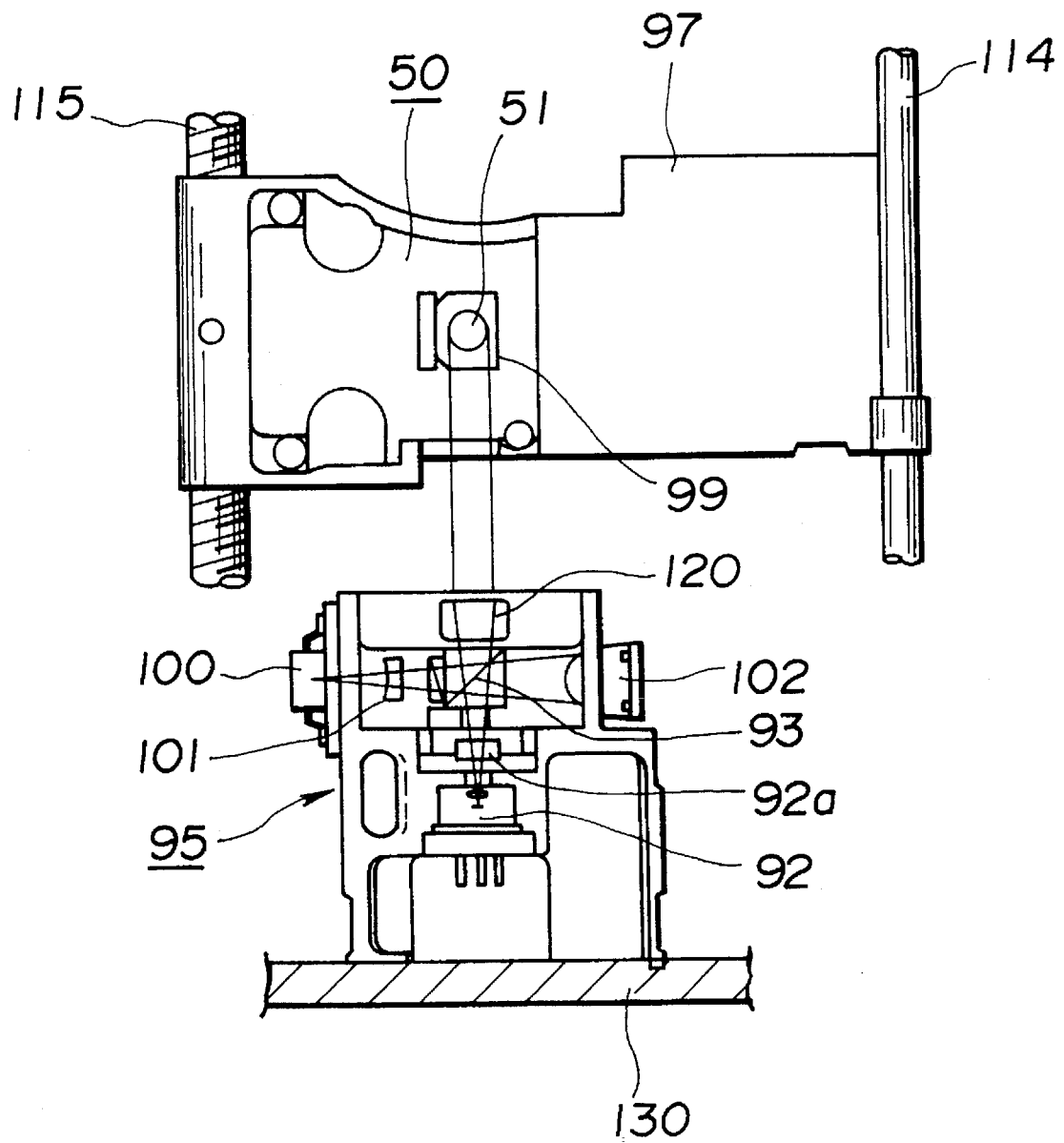
FIG. 18 is a bottom plan view showing an optical pickup unit constituting the optical disc recording and/or reproducing apparatus shown in FIG. 17.

The above-described optical disc recording and/or reproducing apparatus employs the optical pickup unit 96 comprised of the objective lens driving device 50 unified to the optical block 95 inclusive of the semiconductor laser 92, with the optical block 95 being fed along with the objective lens driving device 50 across the inner and outer rims of the object lens driving device 50. However, the optical block 95 may also be isolated from the object lens actuating device 50 and fixedly provided within the main body of the apparatus 130, as shown in FIGS. 17 and 18.

The objective lens actuating device 50 is arranged so that the elastic supports 53, 54 are oriented in the tangential direction to the recording track formed in the optical disc 1. The arrangement of the objective lens actuating device 50 in the optical disc recording and/or reproducing apparatus may be similar to that of the optical pickup unit 96 in the optical disc recording and/or reproducing apparatus.

If the optical block 95 is fixedly arranged in the main body of the apparatus 130 in isolation from the objective lens actuating device 50, the optical block 95 is arranged to tolerate the possible range of movement of the objective lens actuating device 50. That is, the optical block 95 is arranged outside the signal recording area of the optical disc 1 within the main body of the apparatus 130, as shown in FIGS. 17 and 18.

Meanwhile, if the optical block 95 is fixedly arranged in isolation from the objective lens actuating device 50, only the objective lens actuating device 50 is moved across the inner and outer rims of the optical disc 2. As a result, the distance between the optical block 95 and the objective lens actuating device 50 is changed with movement of the objective lens driving device 50. Thus a collimator lens 120 is arranged on the front face side of the beam splitter 93 constituting the optical block 95 in order to permit the light beam outgoing from the semiconductor laser 92 to be collimated and to be incident in this state on the objective lens 51 of the objective lens actuating device 50. That is, the optical block 95 is arranged so as to have an infinite optical system.

The optical block 95 including the semiconductor laser 92 is arranged within the main body of the apparatus so that its optical axis extending from the semiconductor laser 92 up to the collimator lens 120 is parallel to the tracking direction, that is the direction of movement of the objective lens driving device 50 across the inner and outer rims of the disc 2, as shown in FIGS. 17 and 18. By arranging the optical block 95 in this manner, the light beam outgoing from the semiconductor laser 92 is incident on the objective lens actuating device 50 from the lateral side of the objective lens driving device 50. That is, the light beam radiated from the semiconductor laser 92 is collimated so as to be parallel to the tracking direction, that is the direction of movement of the objective lens 51 in the direction normal to its optical axis, before being incident on the objective lens actuating device 50. The light beam incident on the objective lens actuating device 50 has its optical path bent by 90° by the reflective mirror 99 arranged below the objective lens 51 before being incident on the objective lens 51.

The light beam incident on the objective lens actuating device 50 is incident on the reflective mirror 99 arranged on the mounting base 97 via the gap defined between the elastic support 54 supporting the bobbin 52 and the mounting base 97 carrying the objective lens actuating device 50. The light beam incident on the objective lens actuating device 50 has its optical path bent a right angle by the reflective mirror 99 before being incident on the objective lens 51.

The feed means for the objective lens actuating device 50 may be a linear motor 121 mounted within the main body of the apparatus so that the direction of movement of the movable part 123 is parallel to the feed guide shaft 114 for guiding the objective lens actuating device 50 across the inner and outer rims of the disc 1, as shown in FIG. 17. By connecting one end of the mounting base 97 carrying the objective lens actuating device 50 to the movable part 123 via a connecting member 124, the objective lens actuating device 50 may be fed by the linear motor 121 across the inner and outer rims of the disc 1 as indicated by arrow $Y_1$ in FIG. 17.

Since a rotary motor is employed as the pickup feed motor 116 in the above-described pickup feed mechanism 117, the feed screw 115 is mounted parallel to the fed guide shaft 114. If the feed mechanism employs the linear motor 122, the opposite side guide shaft 125 may be an unthreaded shaft similar to the feed guide shaft 114. That is, the opposite side guide shaft 125 needs to have only the function of guiding the movement supporting one end of the mounting base 97.

By the arrangement of feeding only the objective lens driving device 50, the transported part may be reduced in weight in order to increase the speed of the feed operation by the pickup feed unit, thus rendering it possible to access the desired track in the disc 1 more quickly.

Even with the unified optical pickup unit 96 shown in FIG. 15, similarly to the split type unit shown in FIG. 17, the objective lens actuating device 50 and the optical block 95 may be arranged so that the tracking direction, that is the direction of movement of the optical block 95 by the objective lens actuating device 50 across the inner and outer rims of the optical disc 2, is parallel to the optical axis extending from the semiconductor laser 92 up to the beam splitter 93. In this case, the light beam outgoing from the optical block 95 is incident from the lateral side of the objective lens actuating device 50 on the objective lens actuating device 50.

The present invention may be modified without departing from the spirit and scope of the invention. For example, the elastic support for the objective lens driving device 50 is prepared in the above embodiment by punching and bending a thin metal sheet. In addition, the bobbin may be deflectably supported in both the focusing and tracking directions using at least four wire-shaped elastic supporting members. The focusing and tracking coils, produced in the above embodiment by winding the linear material in coils, may also be produced using printed coils for facilitating the wiring and electrical interconnection.

What is claimed is:

1. An objective lens actuating device comprising:

an objective lens having an optical axis;

a bobbin having the objective lens mounted on its one end and also having a coil mounted on its other end;

an elastic support having its one end mounted on said one end of said bobbin carrying the objective lens and having its other end secured to a support holder; and a magnetic circuit having a yoke on which said support holder and a magnet are mounted, said bobbin being driven at least in a direction parallel to the optical axis of the objective lens by the magnet and the coil mounted on said bobbin;

wherein said support holder has a through-hole oriented in a direction normal to the optical axis of the objective lens for allowing passage of a light beam proceeding towards said objective lens.

2. The objective lens actuating device as claimed in claim 1 wherein said objective lens is mounted on a protrusion provided at said one end of the bobbin and wherein said coil is placed within an opening formed at a mid portion of the bobbin so that its winding direction is parallel to the optical axis of the objective lens.

3. The objective lens actuating device as claimed in claim 2 wherein said coil mounted in the opening in said bobbin includes a plurality of further wound coils positioned in a surface parallel to the optical axis of the objective lens and exposed in said opening and having portions parallel to the optical axis of the objective lens.

4. The objective lens actuating device as claimed in claim 3 wherein said yoke has at least two upstanding portions facing each other with a portion of said coil and said further coils being in-between said two upstanding portions, and wherein said magnet is mounted on one of said two upstanding portions.

5. The objective lens actuating device as claimed in claim 1 wherein said coil is formed so as to have a portion perpendicular to the optical axis of said objective lens and is mounted in an opening formed in the bobbin and wherein a further coil having a portion parallel to the optical axis of the objective lens is mounted on the surface of said coil exposed to said opening.

6. An objective lens actuating device comprising:

an objective lens having an optical axis;

a bobbin having the objective lens mounted on its one end and also having a first coil and a second coil mounted on its other end;

an elastic support having its one end mounted on said one end of said bobbin and having its other end secured to a support holder, said elastic support supporting said bobbin for deflection in a direction parallel to the optical axis of said objective lens and in a direction normal to said optical axis; and a magnetic circuit having a yoke on which said support holder and a magnet are mounted, said bobbin being driven in a direction parallel to the optical axis of the objective lens and in a direction normal to said optical axis by the magnet and the first and second coils mounted on said bobbin, wherein the objective lens actuating device is dimensioned to have a length along the direction of deflection of said bobbin in the direction normal to the optical axis of objective lens of 8 mm or less, a length along the direction normal to said direction of deflection of 17 mm or less, and a height of 10 mm or less.

7. The objective lens actuating device as claimed in claim 6 wherein said objective lens is mounted on a protrusion provided at said one end of the bobbin and wherein said first coil is formed so that its winding direction is parallel to the optical axis of the objective lens, said first coil being placed within an opening formed at a mid portion of the bobbin.

8. The objective lens actuating device as claimed in claim 7 wherein said first coil mounted in the opening in said bobbin includes a plurality of wound second coils positioned on a surface parallel to the optical axis of the objective lens and exposed in said opening and having portions parallel to the optical axis of the objective lens.

9. An optical pickup unit comprising:

an objective lens actuating device having:

an objective lens with an optical axis, a bobbin having the objective lens mounted on its one end and also having a coil mounted on its other end, an elastic support having its one end mounted on said one end of said bobbin and having its other end secured to a support holder, and a magnetic circuit having a yoke on which said support holder and a magnet are mounted, said bobbin being driven at least in a direction parallel to the optical axis of the objective lens by the magnet and the coil mounted on said bobbin;

a light source;

a mirror arranged below the objective lens actuating device for deflecting a light beam radiated from said light source by 90°;

a beam splitter for separating the light beam radiated from the light source from a light beam incident thereon from said light source;

a light sensor for receiving the light beam from said beam splitter; and a base for mounting said objective lens actuating device, light source, mirror, beam splitter and the light sensor.

10. The optical pickup unit as claimed in claim 9 wherein said light source, mirror, beam splitter and the light sensor are arranged in a plane parallel to a light beam reaching said mirror from said light source.

11. The optical pickup unit as claimed in claim 9 wherein said objective lens actuating device protrudes along the optical axis of the objective lens from the remaining pickup unit.

12. The optical pickup unit as claimed in claim 9 wherein said base has a surface normal to the optical axis of the objective lens and wherein said objective lens actuating device, light source, mirror, beam splitter and the light sensor are mounted on said surface.

13. An optical pickup unit comprising an objective lens actuating device having:

an objective lens with an optical axis, a bobbin having the objective lens mounted on its one end and also having a coil mounted on its other end, an elastic support having its one end mounted on said one end of said bobbin and having its other end secured to a support holder, said support holder having a light transmitting portion oriented in a direction normal to the optical axis of said objective lens mounted on said bobbin, said light transmitting portion allowing for passage of a light beam incident on said objective lens, and a magnetic circuit having a yoke on which is mounted a magnet said magnetic circuit being adapted for driving said bobbin at least in a direction parallel to the optical axis of said objective lens by the magnet and a coil mounted on said bobbin;

an optical system having a light source for radiating a light beam towards the light transmitting portion in said support holder;

a mirror for deflecting the light beam radiated from the light source by 90° towards said objective lens;

a beam splitter for separating the light beam radiated from the light source from a light beam incident thereon via said objective lens; and a light sensor for receiving the light beam via said beam splitter.

14. The optical pickup unit as claimed in claim 13 wherein said light transmitting portion in said support holder has its inner wall surface serrated.

15. The optical pickup unit as claimed in claim 13 wherein said light transmitting portion in said support holder has a light absorbing layer on its inner wall surface.

16. The optical pickup unit as claimed in claim 13 wherein said support holder is molded from a light-transmitting synthetic material.

17. An optical disc recording and/or reproducing apparatus employing a disc cartridge rotatably housing an optical disc and having an aperture of a width 17 mm or less and a length 24 mm or less for exposing at least a portion of a recording area of the optical disc to outside along the radius of the optical disc, said apparatus comprising: an objective lens actuating device having:

an objective lens with an optical axis, a bobbin having the objective lens mounted on its one end and also having a first coil and a second coil mounted on its other end, an elastic support having its one end mounted on said one end of said bobbin and having its other end secured to a support holder, said elastic support supporting said bobbin for deflection in a direction parallel to the optical axis of said objective lens and in a direction normal to said optical axis, and a magnetic circuit having a yoke on which said support holder and a magnet are mounted, said bobbin being driven in a direction parallel to the optical axis of the objective lens and in a direction normal to said optical axis by the magnet and the first and second coils mounted on said bobbin, wherein the objective lens actuating device is dimensioned to have a length along the direction of deflection of said bobbin in the direction normal to the optical axis of objective lens equal to 8 mm or less, a length along the direction normal to said direction of deflection equal to 17 mm or less, and a height equal to 10 mm or less;

an optical system having a light source for producing a light beam, and a mirror arranged below said objective lens for directing the light beam towards said objective lens;

a beam splitter for separating the light beam radiated from said light source from a return light beam from the optical disc in the disc cartridge;

a light sensor for receiving the light beam via said beam splitter; and a pickup feed mechanism for feeding the optical pickup unit along the radius of the optical disc in the disc cartridge, wherein the objective lens actuating device is introduced into the aperture in said disc cartridge for facing the recording area of the optical disc in the disc cartridge for recording and/or reproducing information signals on or from the optical disc.

18. The optical disc recording and/or reproducing apparatus as claimed in claim 17 wherein the optical system is separated from the objective lens actuating device and is arranged outside of a range of rotation of the objective lens actuating device with the optical axis of the optical system being oriented along the direction of deflection of the bobbin perpendicular to the axis of the objective lens.

19. The optical disc recording and/or reproducing apparatus as claimed in claim 17 wherein the optical system is arranged so that its optical axis is oriented along the direction of deflection of the bobbin parallel to the axis of the objective lens.

20. The optical disc recording and/or reproducing apparatus as claimed in claim 17 wherein the optical system has a surface parallel to the surface of the optical disc and a base on said surface supporting the objective lens actuating device, light source, mirror, beam splitter and the light sensor, said feed mechanism having guide means for guiding the base in a direction parallel to the surface of and along the radius of the optical disc.

21. An objective lens actuating device comprising:

an objective lens having an optical axis;

a bobbin having the objective lens mounted on its one end and also having a first coil and a second coil mounted on its other end;

an elastic support having its one end mounted to said one end of said bobbin and having a mounting portion at its other end supported by a support holder, said mounting portion being formed integrally with a pair of parallel supporting arms for displacing said bobbin in a direction parallel to the optical axis of the objective lens and a deflectable portion for deflecting the bobbin in a direction orthogonal to the optical axis of the objective lens, said elastic support supporting the bobbin for deflection in a direction parallel to the optical axis of the objective lens and in a direction orthogonal to the optical axis of the objective lens; and a magnetic circuit having a yoke on which said support holder and a magnet are mounted, said bobbin being driven in a direction parallel to the optical axis of the objective lens and in a direction normal to said optical axis by the magnet and the first and second coils mounted on said bobbin, wherein a recess having a substantially U-shaped cross-section is formed in said support holder where said mounting portion is supported by said support holder and wherein a buffer material is arranged between the mounting portion of the elastic support and said recess.

22. The objective lens actuating device as claimed in claim 21 wherein said buffer material is a UV curable resin.

* * * * *